(12) United States Patent
Deimer et al.

(10) Patent No.: US 12,448,256 B2
(45) Date of Patent: Oct. 21, 2025

(54) METHOD FOR MOVING A LIFTING DEVICE

(71) Applicant: Palfinger AG, Bergheim bei Salzburg (AT)

(72) Inventors: Thomas Deimer, Moosdorf (AT); David Gfrerer, Zell am See (AT)

(73) Assignee: PALFINGER AG, Salzburg (AT)

( * ) Notice: Subject to any disclaimer, the term of this patent is extended or adjusted under 35 U.S.C. 154(b) by 0 days.

(21) Appl. No.: 18/944,954

(22) Filed: Nov. 12, 2024

(65) Prior Publication Data

US 2025/0066166 A1 Feb. 27, 2025

Related U.S. Application Data

(63) Continuation of application No. PCT/AT2023/060150, filed on May 8, 2023.

(30) Foreign Application Priority Data

May 13, 2022 (AT) .............................. A 50083/2022

(51) Int. Cl.
*G06F 17/00* (2019.01)
*B60P 1/54* (2006.01)
(Continued)

(52) U.S. Cl.
CPC ............ *B66C 13/48* (2013.01); *B60P 1/5433* (2013.01); *B66C 13/12* (2013.01)

(58) Field of Classification Search
CPC ....... B66C 13/48; B66C 13/12; B66C 13/085; B66C 23/54; B66C 1/68; B66C 3/20;
(Continued)

(56) References Cited

U.S. PATENT DOCUMENTS 10,173,866 B2 * 1/2019 Deimer .................. B66C 23/42
10,836,613 B2 11/2020 Gustafsson et al.
(Continued)

FOREIGN PATENT DOCUMENTS

CN 201358142 12/2009
CN 113213356 8/2021
(Continued)

OTHER PUBLICATIONS

Modelling, simulation and control of a hydraulic crane (Year: 2007).*

(Continued)

*Primary Examiner* — Ronnie M Mancho
(74) *Attorney, Agent, or Firm* — Wenderoth, Lind & Ponack, L.L.P.

(57) ABSTRACT

A method for moving a lifting device includes: in a presetting phase, presetting at least one target position for the lifting device; in a measuring phase, detecting an instantaneous geometry of the arm system; in a selection phase, selecting a target position specified in the presetting phase; in a comparison phase, determining a geometrical deviation between the geometry of the target position selected in the selection phase and the instantaneous geometry detected in the measuring phase; in a generation phase, generating at least one control command on the basis of the geometrical deviation determined in the comparison phase; and in a control phase, performing at least partial movement of the lifting device into the selected target position by actuating the actuators of the arm system with the at least one control command generated in the generation phase.

20 Claims, 24 Drawing Sheets

(51) Int. Cl.
*B66C 13/12* (2006.01)
*B66C 13/48* (2006.01)

(58) Field of Classification Search
CPC ......... B66C 23/42; B66C 23/46; B66C 23/48; B66C 13/08; B60P 1/5433; B01D 45/16; B04C 3/00; H01M 8/04291
USPC .......................................................... 701/50
See application file for complete search history.

(56) References Cited

U.S. PATENT DOCUMENTS

| | | | |
|---|---|---|---|
| 11,505,437 B2* | 11/2022 | Hoffmann | B66C 23/68 |
| 11,858,784 B2* | 1/2024 | Minami | B66C 23/42 |
| 12,214,500 B2* | 2/2025 | Pivac | B25J 9/1664 |
| 2013/0023382 A1 | 1/2013 | Ljungdahl | |
| 2013/0233820 A1 | 9/2013 | Eberharter et al. | |
| 2016/0318739 A1 | 11/2016 | Terata et al. | |
| 2017/0029252 A1* | 2/2017 | Deimer | B60P 1/54 |
| 2017/0283223 A1 | 10/2017 | Shan et al. | |
| 2019/0233258 A1 | 8/2019 | Reischauer et al. | |
| 2019/0308851 A1 | 10/2019 | Gustafsson et al. | |
| 2020/0331737 A1 | 10/2020 | Reischauer et al. | |
| 2020/0392746 A1 | 12/2020 | Bertram et al. | |
| 2021/0284507 A1 | 9/2021 | Minami | |
| 2021/0347288 A1 | 11/2021 | Rösth et al. | |
| 2022/0009749 A1* | 1/2022 | Hoffmann | B66C 13/48 |
| 2024/0076170 A1* | 3/2024 | Deimer | B66C 13/46 |
| 2024/0317548 A1* | 9/2024 | Mayrdorfer-Schindlauer | B66C 23/701 |
| 2024/0367948 A1 | 11/2024 | Tjernberg et al. | |
| 2025/0066166 A1* | 2/2025 | Deimer | B66C 1/68 |

FOREIGN PATENT DOCUMENTS

| | | |
|---|---|---|
| EP | 2 982 635 | 2/2016 |
| EP | 3 257 805 | 12/2017 |
| EP | 3 553 015 | 10/2019 |
| EP | 3 828 120 | 6/2021 |
| EP | 3 839 675 | 6/2021 |
| EP | 3 907 171 | 11/2021 |
| JP | 2019-530627 | 10/2019 |
| WO | 2017/157482 | 9/2017 |
| WO | 2018/068071 | 4/2018 |
| WO | 2019/136505 | 7/2019 |
| WO | 2023/033706 | 3/2023 |

OTHER PUBLICATIONS

International Search Report issued Jul. 19, 2023 in International (PCT) Application No. PCT/AT2023/060150.

* cited by examiner

METHOD FOR MOVING A LIFTING DEVICE

The present application is a continuation of International Application PCT/AT2023/060150, filed on May 8, 2023. Thus, all of the subject matter of International Application PCT/AT2023/060150 is incorporated herein by reference.

BACKGROUND OF THE INVENTION

The present invention relates to a method for moving a lifting device, a computer program product for carrying out such a method, a data carrier signal for transmitting such a computer program product, a controller for carrying out such a method and a lifting device with such a controller.

Methods for moving a lifting device are also known in the prior art.

In conventional methods for moving a lifting device, the individual actuators of the arm system of a lifting device are controlled directly by a user using control commands generated by the user via a user interface of a controller. The movement of the arm system results from the individual adjustment movements controlled by the user. When moving the arm system to a desired target position, which is linked to a given geometry of the arm system, the user must carry out targeted adjustment movements starting from an existing position that deviates from the desired position. This is disadvantageous because it involves a high workload for the user and a high time expenditure due to possible corrections to the geometry of the arm system when approaching the target position.

Methods for moving a lifting device are also known in which coordinate control of the arm system takes place. The individual actuators of the arm system are controlled by the controller in such a way that the user controls the behavior of the crane tip of the arm system instead of the individual actuators themselves. For each specified path that the crane tip should follow in a coordinate control, an infinite number of paths that the arms of the arm system should follow along the corresponding degrees of freedom are possible. If, for example, the crane tip or a picked up load is repeatedly moved along a path, the arm system can get into a wide variety of geometries during the movements and in the end position. The same position of the crane tip can be given for a wide variety of positions of the arm system. Especially for overdetermined arm systems with redundant degrees of freedom of movement, the generation of control commands required to implement coordinate control can represent a high computational effort for a control system. When moving a coordinate-controlled arm system, unpredictable geometry changes of the arm system may also occur for a user.

SUMMARY OF THE INVENTION

The object of the invention is to provide an improved method for moving a lifting device, as well as a computer program product for carrying out such a method, a data carrier signal for transmitting such a computer program product, a controller for carrying out such a method and a lifting device with such a controller, which do not have the disadvantages mentioned above. In particular, the movement of the arm system should be carried out in an intuitively predictable manner for a user and the arm system should be able to have a substantially preset or predeterminable geometry in the respective end position of the movement.

This object is achieved by a method for moving a lifting device as described below, a computer program product for carrying out such a method, a data carrier signal for transmitting such a computer program product, a controller for carrying out such a method and a lifting device with such a controller.

The method according to the invention is suitable for moving a lifting device. The lifting device can, for example, be designed in the form of a crane, a loading crane or a lifting platform in the form of a crane with a work cage arranged thereon.

The lifting device can have an arm system with arms with a variable geometry, wherein arms of the arm system can be moved relative to each other by at least one actuator along at least one degree of freedom.

The movements along a degree of freedom can be carried out by an actuator corresponding to the degree of freedom. For example, two arms pivotally mounted together can be pivoted relative to each other by an actuator. Two arms that are mounted so that they can move relative to each other can, for example, be moved relative to each other by an actuator.

The lifting device can be moved by essentially free control of actuators by issuing operating commands by a user, preferably via a suitable user interface. For example, individual actuators of the lifting device can be specifically controlled based on operating commands from a user by means of corresponding control commands.

The degrees of freedom of the arm system can basically include angles of arms of the arm system to each other and lengths of length-adjustable arms.

In a presetting phase, the lifting device can be brought into at least one target position by controlling actuators in order to specify at least one target position for the lifting device. The actuators can be controlled by a user issuing operating commands, preferably via a suitable user interface, with corresponding control commands. At least one target position can be achieved, for example, by directly approaching the position with the arm system. The actuators can basically be designed in the form of hydraulic cylinders or corresponding electric drives.

Control commands can generally be issued by the control system in the form of control pulses with an amplitude and a signal duration, wherein control pulses can be used, for example, to switch electrical drives and/or control valves for the hydraulic supply of actuators of the lifting device.

In the at least one preset target position, the existing instantaneous geometry of the arm system can be detected on the basis of the at least one degree of freedom.

Alternatively or in combination, in a presetting phase, at least one target position for the lifting device can be preset by specifying the geometry of the arm system in at least one target position on the basis of the at least one degree of freedom via a user interface of the controller. A user can store or program at least one target position based on at least one degree of freedom by means of a user interface of the controller, wherein it is not necessary to directly approach the position with the arm system.

It is conceivable that in a presetting phase the lifting device is brought into a further target position by controlling actuators and a further detection of the existing instantaneous geometry of the arm system is carried out on the basis of at least one degree of freedom. It is generally possible that in a presetting phase for several target positions the respective instantaneous geometry of the arm system is based on at least one degree of freedom.

In principle, a presetting phase can be carried out as often as desired and at any time during the operation of the lifting device.

When presetting the geometry and/or detecting the instantaneous geometry of the arm system, values for all degrees of freedom of the arm system can in principle be preset and/or detected. This makes it possible to essentially completely determine the instantaneous geometry of the arm system, if necessary taking into account stored data regarding the configuration of the arm system.

It should not be excluded that, when presetting by specifying the geometry of the arm system in at least one target position on the basis of at least one degree of freedom, values for selected degrees of freedom of the arm system can be preset via a user interface of the controller.

The instantaneous geometry of the arm system can be understood as the currently existing geometry of the arm system.

In a measuring phase, the instantaneous geometry of the arm system can be detected based on the at least one degree of freedom. In this case, after carrying out the or a preset phase, for example by controlling actuators, the lifting device can be brought into a position that differs from the at least one first target position and is preferably essentially freely selectable.

A detecting of the instantaneous geometry of the arm system based on at least one degree of freedom can be carried out in a measuring phase separately from a detecting of the geometry in a presetting phase.

In principle, a measuring phase can be carried out several times and at any time within the method. It is conceivable that a measuring phase is carried out cyclically, in particular periodically. A measuring phase can be carried out, for example, when there is a change in the geometry of the arm system, preferably every time.

In a selection phase, a selection of at least one target position specified in the presetting phase can be made. It can be provided that the method moves the lifting device into or approaches the at least one target position selected in the selection phase.

A selection of at least one target position can be made by a user via a user interface of the controller.

It should not be excluded that the last preset target position in a presetting phase is the currently selected target position.

In principle, the selection phase can be carried out independently of the measuring phase. For example, the selection of at least one target position can take place in a selection phase before or after a measuring phase.

In a comparison phase following a measuring phase and the selection phase, a geometrical deviation between the geometry of the at least one target position selected in the selection phase and the instantaneous geometry detected in the measuring phase can be determined by comparing the respective geometries of the arm system on the basis of the at least one degree of freedom.

The geometrical deviation can basically be caused by different geometries of the arm system, for example by different pivoting positions and/or sliding positions of arms of the arm system that can be moved relative to one another, in the presetting phase—corresponding to at least one target position selected in the selection phase—and the measuring phase. Different geometries can be compared based on at least one degree of freedom.

A geometry deviation can be determined qualitatively and quantitatively based on at least one degree of freedom.

The movements along a degree of freedom can be carried out by an actuator corresponding to the degree of freedom. A geometry deviation determined on the basis of at least one degree of freedom can be assigned to an actuator belonging to the respective degree of freedom.

In principle, a measuring phase can take place as often as desired and at any time during the operation of the lifting device.

In a generation phase following the or a comparison phase, at least one control command for controlling at least one of the actuators of the lifting device can be generated on the basis of the geometric deviation determined in the comparison phase. With the at least one control command, by controlling at least one of the actuators, an approach or at least partial transfer of the arm system of the lifting device from the geometry detected in the measuring phase to the geometry of the at least one target position selected in the selection phase can take place.

The at least one control command can be generated to approach or transfer the arm system of the lifting device from the geometry detected in the measuring phase to a geometry that approximates the geometry of the at least one target position selected in the selection phase within a predeterminable or preset tolerance range.

The movement of the arm system along the at least one degree of freedom that can be implemented with the at least one control command can approximate the geometry of the arm system within a tolerance range of the geometry of the at least one target position selected in the selection phase. A tolerance range for at least one degree of freedom can be preset or specifiable.

The tolerance range can be preset depending on various operating parameters of the lifting device, such as temperature, projection and/or torque load of the arm system, the mass of a load carried or the inclination of the lifting device. In particular, the control system can calculate and preset a corresponding tolerance range by taking sensor data into account. A presetting by a user, for example for one or more degrees of freedom of the arm system, is also conceivable.

A geometric deviation determined in a comparison phase can be compensated for with at least one control command within a preset or predeterminable tolerance range.

When at least one of the actuators is controlled with the at least one control command generated in the generation phase, a geometry deviation determined in the comparison phase from at least one first target position, or also from a further target position, can be minimized.

Because the control commands can be generated on the basis of a geometry deviation using the method according to the invention, the arm system of the lifting device in a target position can essentially have the geometry specified and/or detected in a presetting phase. This differs from methods in which a target position is characterized by the position of a crane tip of the arm system and, when the lifting device moves to such a target position, the geometry of the arm system can deviate from the geometry existing when the target position was preset.

Such control can be carried out in a control phase. In this case, the lifting device can be at least partially moved into the selected target position by controlling the actuators of the arm system with the at least one control command generated in the generation phase.

If the sequence of the measuring phase, the comparison phase, the generation phase and the control phase is carried out several times, an iterative approximation—if necessary within a tolerance range—of the geometry of the arm system to the geometry of the at least one target position selected in the selection phase can take place.

In particular, by repeatedly performing the sequence of the measuring phase, the comparison phase, the generation phase and the control phase, the movement of the arm system can be controlled. The actual movement implemented with the generated and output control commands and the resulting geometry change of the arm system of one pass can be taken into account in the generation phase and the control phase in a further pass.

Such feedback can be used, for example, to compensate for deviations in operating parameters such as temperature, friction or the load on the lifting device between the presetting phase and the measuring phase.

It should not be excluded that the lifting device is moved by the process between different target positions, selectable in a selection phase. For example, after reaching at least one target position, the lifting device can be moved to a second target position by controlling the actuators of the arm system with at least one control command generated in a further generation phase. After reaching the target position, a measuring phase can be carried out on the basis of which a geometric deviation from a second target position can be determined. A target position can be reached within a preset or predeterminable tolerance range.

It should not be ruled out that during the execution of the method, a user may make manual corrections to the geometry of the arm system, and the controller may have a suitable operating mode for this purpose. Manual corrections can be detected in a subsequent measuring phase and taken into account when generating control commands in a generation phase.

Based on a geometry deviation, a control command can in principle be generated for each degree of freedom for which a deviation is determined.

Due to the high complexity of the geometry of some arm systems, which can include, for example, a crane column, a main arm (also called a lifting arm) pivotally mounted on the crane column and an articulated arm pivotally mounted on the main arm with a sliding arm mounted in it, the arm system can have a large number of degrees of freedom. In the prior art, such arm systems are known, for example, as redundant or overdetermined manipulators.

The excess of mobility due to the over-determination of the arm system allows movement between two different geometries to occur in different ways, in other words through different movements.

A processor or a computing unit of a control system can perform a so-called backward transformation or kinematic reversal to generate corresponding control commands for a movement. In order to obtain a unique solution for such a backward transformation for an overdetermined arm system, the backward transformation for generating control commands for the arm system must be carried out taking into account optimization criteria (such as so-called cost functions with weighting matrices) and, if necessary, with approximations and is associated with high computational effort. A particularly simple generation of control commands can be achieved by directly determining the geometry deviation between two known geometries, i.e. between at least one predeterminable target position and a geometry determined in a measuring phase. From the geometry deviation determined on the basis of the at least one degree of freedom, at least one control command for at least one actuator corresponding to the respective degree of freedom can be directly generated. This makes it possible to calculate a unique solution for a backward transformation.

In particular, in the generation phase, control commands can only be generated for actuators for which a geometric deviation along the at least one degree of freedom corresponding to the actuator is determined in the comparison phase. A geometry deviation determined on the basis of at least one degree of freedom can be assigned to an actuator belonging to the respective degree of freedom, whereby the actuators involved in the movement to the at least one target position can be determined. Controlling an actuator in a control phase can only be advantageous if a deviation along the corresponding degree of freedom is determined in the comparison phase.

The arm position resulting after the movement, i.e. the geometry of the arm system, can be essentially identical to the arm position of the arm system when the presetting phase is carried out after the control phase has been carried out, if necessary after repeated execution of the same, as described above. The geometries of the arm positions can correspond to each other within a preset or predeterminable tolerance range.

When the lifting device is in operation, the method may make it possible to move to several different target positions one after the other. By controlling the geometry deviation from a target position, collisions can be avoided through a predictable movement of the arm system. For example, a user can specify a sequence of movements to change the geometry of the arm system by specifically presetting a sequence of target positions.

This makes it possible to move back and forth between two or more target positions via one or more defined intermediate positions. Another advantage is that information about the entire trajectory does not have to be stored in the controller's memory, but only the target positions that serve as intermediate positions.

The at least one target position can generally correspond to a position of the lifting device that can be essentially freely selected by controlling actuators. The geometry of the arm system can be essentially freely selectable for the at least one target position within the structurally preset ranges of the degrees of freedom of the arm system.

The instantaneous geometry of the lifting device detected in the measuring phase may correspond to a geometry of the arm system that deviates from a target position specified in the presetting phase and from a target position selected in the selection phase. The geometry of the arm system can essentially be freely selected for the measuring phase within the structurally specified ranges of the degrees of freedom of the arm system, for example by controlling actuators.

The detection of an instantaneous geometry can basically be carried out on the basis of sensor data from sensors arranged on the lifting device for angle measurement and/or length measurement. In principle, sensor data can be detected for all degrees of freedom of the arm system. The sensor data can be detected, for example, in a quantitative determination of pivot positions and/or sliding positions of arms of the arm system that can be moved relative to one another. An angle measurement of the inclination angle of the lifting device can also be carried out.

When the instantaneous geometry of the arm system is detected and/or the geometry of the arm system is specified via a user interface of the controller, a deflection of the arm system can be determined on the basis of a calculation model.

A deflection of the arm system can occur due to the inherent torques of the arms of the arm system. A load on the lifting device, for example due to a load being picked up and/or an additional device being installed, can cause additional deflection of the arm system.

A deflection can generally be determined based on the geometry of the arm system and/or the load on the lifting device.

A corresponding calculation model can be stored in a memory of the controller. A deflection existing in a certain position can be determined on the basis of a calculation model taking into account at least one specified and/or detected degree of freedom of the mobility of the arm system and/or a load of the lifting device.

By detecting the instantaneous geometry of the arm system in a target position in a specified phase, an existing deflection of the arm system can be determined on the basis of a calculation model.

If the geometry of the arm system is specified via a user interface of the controller for a target position in a presetting phase, an expected deflection of the arm system can be determined on the basis of a calculation model.

In addition to the degrees of freedom of the arm system, which can basically comprise angles of arms of the arm system to each other and lengths of length-adjustable arms, the geometry of the arm system can be characterized by deflections of arms of the arm system determined in a calculation model.

An expected or existing deflection of the arm system can be determined in an appropriate calculation model for different loads on the lifting device in a presetting phase and in a measuring phase. Different loads on the lifting device can result from different loads and different geometries of the arm system, for example. The lifting system can be loaded in a manner known in the prior art, for example via suitable load sensors or by incorporating hydraulic pressures in appropriately designed actuators.

By taking into account the deflections of arms of the arm system determined on the basis of a calculation model—including specified or detected geometries and, if applicable, loads on the arm system—the geometry of the arm system can in principle be more accurately approximated to the geometry of at least one target position selected in the selection phase.

When detecting the instantaneous geometry of the arm system and/or specifying the geometry of the arm system via a user interface of the controller, an inclination of the lifting device relative to a preset or predeterminable spatial direction, for example a horizontal or a vertical direction, can be detected.

In addition to the degrees of freedom of the arm system, which can basically comprise angles of arms of the arm system to each other and lengths of length-adjustable arms, the geometry of the arm system can be characterized by a detected inclination of the lifting device.

By detecting the inclination and incorporating it into a corresponding calculation model, a compensation of a geometric deviation between an instantaneously existing geometry and the geometry of at least one target position selected in the selection phase can be achieved.

With an appropriate calculation model, a more accurate approximation of the geometry of the arm system to the geometry of the at least one target position selected in the selection phase can be achieved, taking into account the currently existing inclination of the lifting device.

When detecting the instantaneous geometry of the arm system and/or specifying the geometry of the arm system via a user interface of the controller, a position of at least one additional device relative to the arm system of the lifting device can be detected. An additional device arranged or arrangeable on the arm system can be designed in the form of a working device and/or an arm extension, preferably a static arm extension that can optionally be arranged at a predeterminable angle, and/or a work cage. Information on the range of functions, dimensions and angular positions of an additional device can be stored in a memory of the controller.

Additionally or alternatively, a particularly sensor-based geometry detection of the at least one additional device can be carried out on the basis of at least one degree of freedom of the geometry of the additional device, for example variable distances or angles of movable parts of the additional device.

The detected position and/or geometry of the at least one additional device relative to the arm system of the lifting device can be included in the determination of a geometry deviation in the comparison phase.

In an advantageous embodiment of the method, in the presetting phase, a specification and/or detection of at least one value of at least one degree of freedom of arms of the arm system that are movable relative to one another along the at least one degree of freedom can take place. In the measuring phase, a repeated detecting of at least one value of at least one degree of freedom can advantageously take place, and in the comparison phase the determination of the geometry deviation can subsequently take place by determining a deviation of the at least one value selected accordingly in the selection phase and specified and/or detected in the presetting phase from the at least one value detected in the measuring phase.

The at least one control command generated in the generation phase can in principle comprise information about an actuator to be controlled. When determining the geometry deviation, an actuator associated with a degree of freedom that deviates from a target position can be identified and a control command can be assigned to this actuator. The control command may further include a nominal signal duration for the duration of the control.

A nominal signal duration can generally be preset depending on the achievable rate of change of the geometry change when controlling the corresponding actuator. A nominal signal duration can be a guideline for the control duration of the corresponding actuator and serve as a basis for comparing different control commands.

It should not be ruled out that the signal duration implemented in the control phase can be varied depending on further control commands and/or operating commands and/or structural conditions of the lifting device. In particular, the respective implemented signal duration can also be varied in the control phase.

In an advantageous embodiment of the method, at least two control commands can be generated in the generation phase and the actuators can be controlled in the control phase with the at least two control commands generated in the generation phase in principle at least partially sequentially and/or at least partially simultaneously.

Partially sequential and/or at least partially simultaneous control can be carried out in different embodiments according to different criteria.

For example, actuators can be controlled at least partially sequentially according to the magnitude of the geometry change when controlling one of the controlled actuators. Large changes in the geometry of the arm system can first occur in the control phase.

Alternatively or in combination, actuators can be controlled at least partially sequentially according to the magnitude of the reduction in the projection of the arm system when controlling one of the controlled actuators. Changes in the geometry, which lead to a reduction in the load torque acting on the lifting device, which can basically be related to the projection of the arm system, can first be made in the control phase Alternatively or in combination, actuators can be controlled at least partially according to a cost function. Such cost functions, which are known in the prior art, can, for example, contribute to an energy- or time-optimized movement of the arm system.

Alternatively or in combination, actuators can be controlled at least partially simultaneously, wherein a respective signal duration of the at least two control commands is matched with the largest nominal signal duration of the control commands. The signal duration of different control commands for different actuators can be scaled to the signal duration of the control command with the longest nominal signal duration when the control command is generated. An amplitude and thus a rate of change of the movement of the corresponding actuator can be scaled according to the changed signal duration. In this way, when several actuators are controlled at least partially simultaneously, the end position specified for the target position is reached essentially simultaneously by all actuators involved.

In principle, the actuators can be controlled at least partially sequentially and/or at least partially simultaneously. Different actuators can be controlled with a temporal overlap.

It should not be ruled out that the output of the control commands for the actuators involved in the movement to at least one target position is controlled by a user. It may therefore be possible that the control commands required for movement to at least one target position are generated in the generation phase and the output is controllable by a user in the control phase.

In the presetting phase, the lifting device can advantageously be essentially freely movable with control commands generated by a user via a controller for controlling actuators. This can correspond to a conventional controller of the lifting device, in which the actuators of the arm system are directly controlled by a user or operator through control commands generated by them, whereby the movement of the arm system results from the individual actuating movements controlled by the user. In the control phase, a movement of the lifting device can advantageously be carried out by at least one control command generated by a controller in the generation phase. In contrast to a control in the presetting phase, the arm system can be moved without the user having to generate complex individual control commands. The control commands can be generated by a controller and issued at least partially automatically. It is therefore not necessary for a user to generate specific control commands for each individual actuator. Advantageously, in the control phase, the lifting device can be moved at least partially automatically by issuing the at least one control command generated in the generation phase by a controller.

At least partially automated movement can be achieved by controlling actuators by issuing control commands that are generated by a control of the lifting device depending on certain presets and are at least partially automatically output by a control to the actuators. Individual or multiple actuators can be controlled by a controller, possibly depending on an operating command from a user, using control commands generated by the controller.

Protection is also sought for a computer program product comprising commands which, when executed by a computing unit, cause the computing unit to carry out a method as described above from a memory which is in a data connection with the computing unit or which can be brought into such a connection with the same.

Protection is also sought for a data carrier signal which transmits the computer program product described above.

Protection is also sought for a controller for a lifting device, preferably for a loading crane or a mobile lifting platform, which is designed to carry out a method for moving a lifting device as described above.

In a first operating mode, the control system can carry out the presetting phase for specifying at least one target position by controlling actuators and for first detecting the instantaneous geometry of the arm system on the basis of at least one degree of freedom. In this case, for example, sensor data detected during geometry detection on degrees of freedom of sensors that can be arranged or are arranged on the lifting device, for example represented by values of degrees of freedom, can be stored in a memory of the controller. Alternatively or in combination, the geometry of the arm system in at least one target position can be specified on the basis of the at least one degree of freedom via an user interface of the controller. For example, values of degrees of freedom can be entered by a user via a user interface of the controller and stored in a memory of the controller. In a first operating mode of the controller, at least one target position can be stored in a memory of the controller in the presetting phase.

In a second operating mode of the control, the measuring phase can be carried out for repeatedly detecting the instantaneous geometry of the arm system on the basis of at least one degree of freedom. In this case, for example, sensor data detected during geometry detection on degrees of freedom of sensors that can be arranged or are arranged on the lifting device, for example represented by values of degrees of freedom, can be stored again in a memory of the controller. It is conceivable that the control repeatedly switches to the second operating mode and carries out a measuring phase. A change to the second operating mode and the execution of a measuring phase can take place cyclically, in particular periodically. In particular, this can be done with one, preferably every, change in the geometry of the arm system.

In a third operating mode, the selection phase can be carried out to select at least one target position specified in the presetting phase. A selection of at least one target position can be made by a user via a user interface of the controller. At least one target position stored in a memory can be selectable, for example, via a user interface of the controller.

In a fourth operating mode, the comparison phase for determining the geometry deviation can be carried out on the basis of at least one degree of freedom between the geometry of the at least one target position selected in the selection phase and the instantaneous geometry detected in the measuring phase. The comparison phase can be carried out with a computing unit of the controller that is configured for this purpose, wherein the computing unit of the controller is in data connection with the memory of the controller or can be brought into such a connection. The determined geometry deviation can be stored in a memory of the controller, for example represented by values for deviations of degrees of freedom.

In a fifth operating mode, the generation phase for generating at least one control command for controlling at least one of the actuators of the lifting device for approaching or at least partially transferring the arm system of the lifting device from the geometry detected in the measuring phase to the geometry of the at least one target position selected in the selection phase can be carried out with a computing unit of the controller configured for this purpose. The generated control commands can, for example, include information about one of the actuators to be controlled and a signal duration for the duration of the control and can be stored in a memory of the controller. In a sixth operating mode, the control phase for controlling the actuators of the arm system of the lifting device can be carried out by the controller issuing the at least one control command generated in the generation phase. The control commands can be read from a memory of the controller and output via a suitable interface to control the respective actuators.

If the sequence of the measuring phase, the comparison phase, the generation phase and the control phase is carried out several times as already described—with the associated change to the corresponding operating mode—an iterative approximation of the geometry of the arm system to the geometry of the selected at least one target position can advantageously be carried out.

The controller can basically have a user interface by which a user can generate control commands for actuators by issuing operating commands. The user interface can be designed as operating elements, for example in the form of switches, push buttons, control levers, joysticks and/or a touch-sensitive screen.

In an advantageous embodiment of the controller, in the sixth operating mode, at least one operating element of a user interface can be activated to control the actuators, and the geometry of the arm system can be changed at least partially automatically by the controller by actuating the at least one operating element by a user.

In this embodiment, a movement of the arm system by the control commands generated on the basis of the geometry deviation, wherein the movement can comprise several actuators, can essentially be carried out by actuating a single operating element or several operating elements. Different degrees of freedom or groups of degrees of freedom of movement can, for example, be assigned to different operating elements.

The actuators can be controlled fully automatically or partially automatically by activating at least one operating element of a user interface of the control system.

In an advantageous embodiment, information, preferably information on the range of functions and/or dimensional information and/or angular positions, for at least one additional device can be stored in a memory of the controller via a user interface of the controller. The information can, for example, be selectable from a database stored in a memory of the controller and/or can be entered via a user interface, preferably via a setting mask.

The controller may comprise a, preferably portable, control panel, wherein the user interface may be formed on the control panel.

In particular, the user interface can be menu-driven and/or comprise at least one operating element of the controller.

Preferably, the controller can control a rate of change of the geometry of the arm system, in other words a speed of movement, depending on an actuation of the at least one operating element of the user interface, in particular depending on a deflection when the operating element is designed in the form of an operating element.

Protection is also sought for a lifting device, in particular a loading crane or a lifting platform, with an arm system has a plurality of arms movable by actuators, wherein the arm system has at least:

a crane column rotatable about a rotation axis by a first actuator, wherein the arm system has a first degree of freedom ($\varphi$) due to the pivotable mounting of the crane column, and a main arm that can be pivoted relative to the crane column by means of a second actuator, wherein the arm system has a second degree of freedom (a) due to the pivotable mounting of the main arm.

The lifting device can have a controller as described above, with which control commands can be issued to actuators of the arm system in order to change the geometry of the arm system. The controller can detect an instantaneous geometry of the arm system on the basis of the degrees of freedom of the lifting device on the basis of sensors installed on the arm system.

In an advantageous embodiment of the lifting device, it can further comprise at least the following arms:

an articulated arm that can be pivoted relative to the main arm using a third actuator, whereby the arm system has a third degree of freedom due to the pivotable mounting of the articulated arm, and at least one sliding arm slidingly mounted in the articulated arm with a fourth actuator, wherein the arm system has a fourth degree of freedom due to the displaceable mounting of the sliding arm.

Such an embodiment of the lifting device can be provided, for example, for a loading crane or a crane with a work cage arranged on it.

In further embodiments of the lifting device, a second articulated arm and/or an additional working device, for example in the form of a fork, a rotary element or a gripper, can be arranged on the arm system.

A lifting device as described above can be mounted on a vehicle. This makes it possible to create a mobile lifting device.

BRIEF DESCRIPTION OF THE DRAWINGS

Exemplary embodiments of the invention are discussed by way of example with reference to the drawings, in which.

DETAILED DESCRIPTION OF THE INVENTION

Figure 1A:
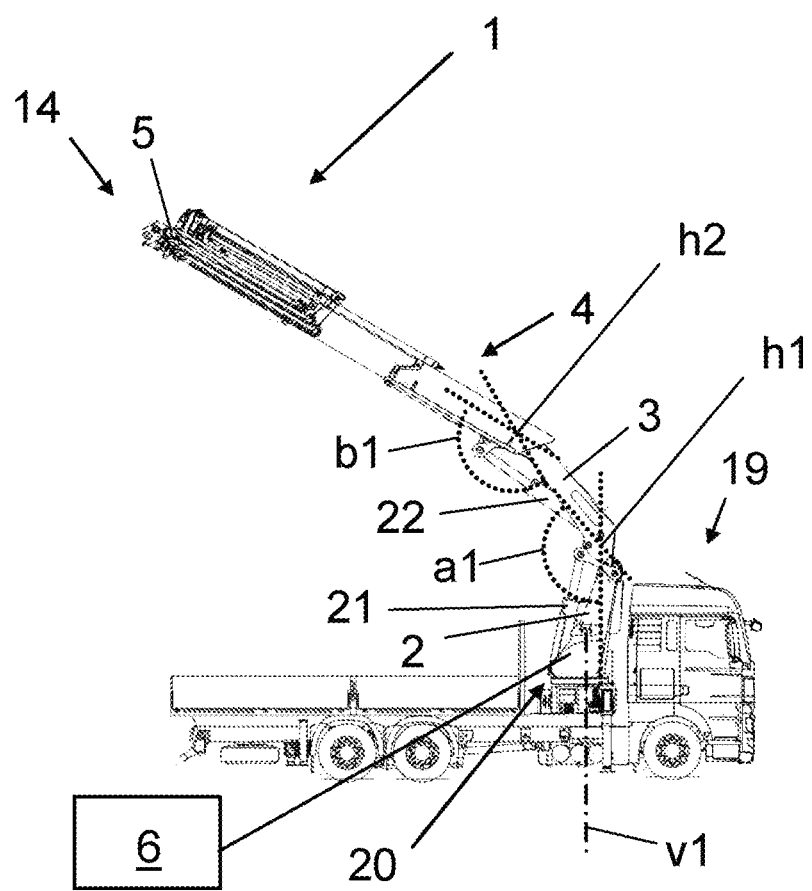
FIGS. 1a to 1c are side views of various embodiments of a lifting device mounted on a vehicle.
Figure 1B:
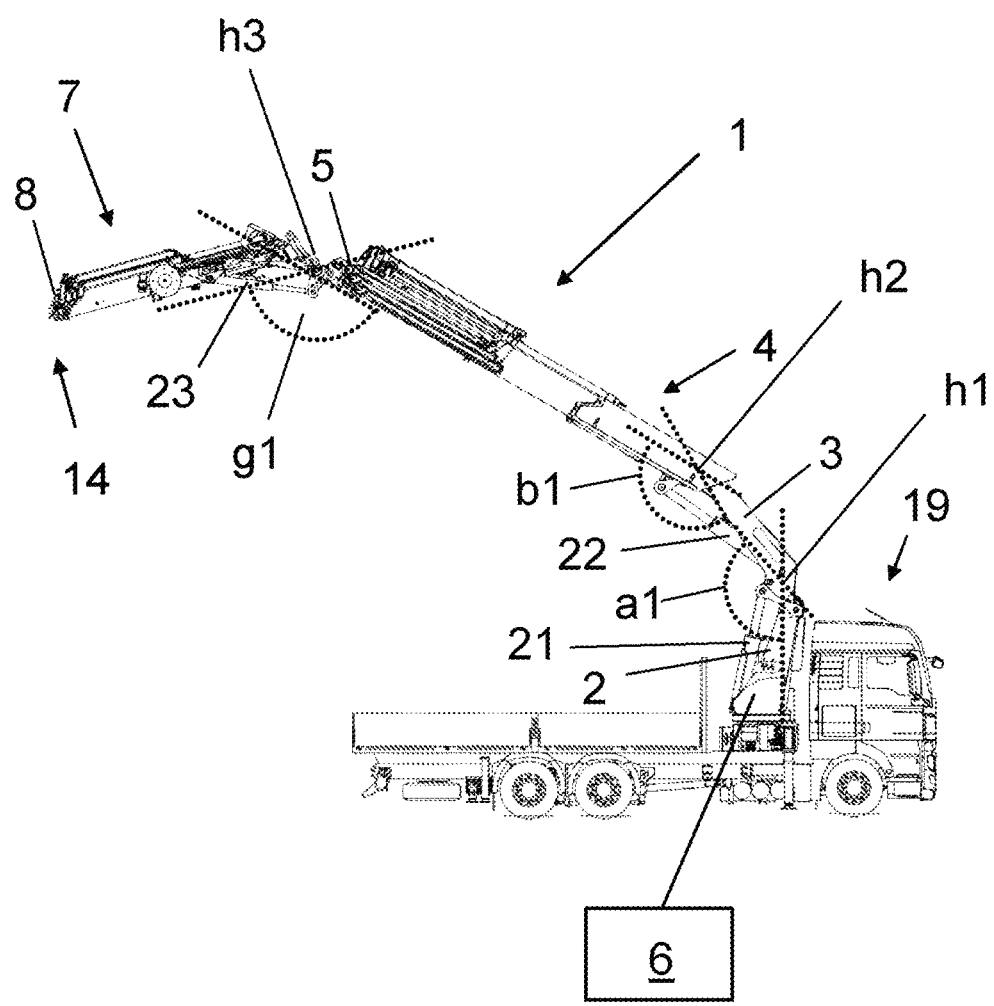
Figure 1C:
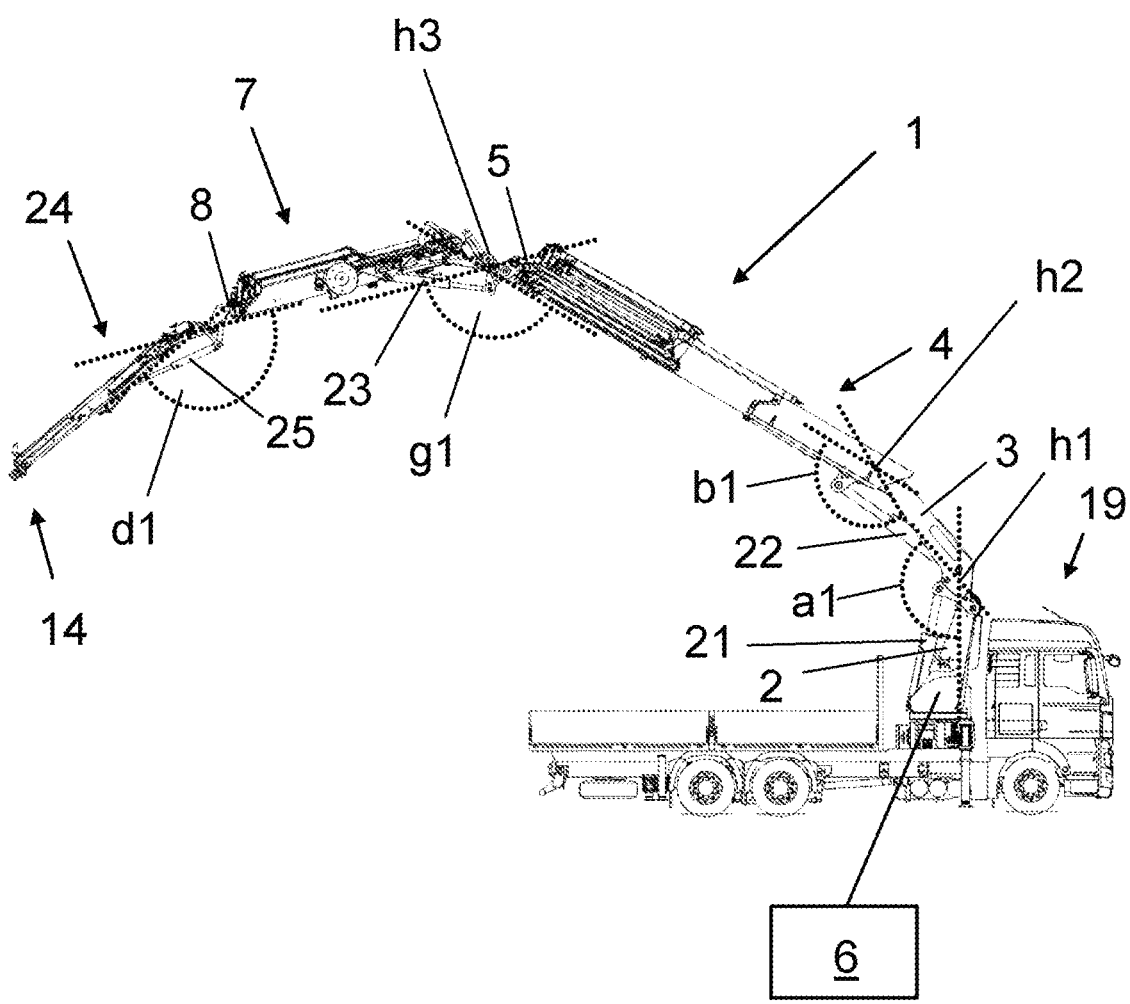
Figure 2A:
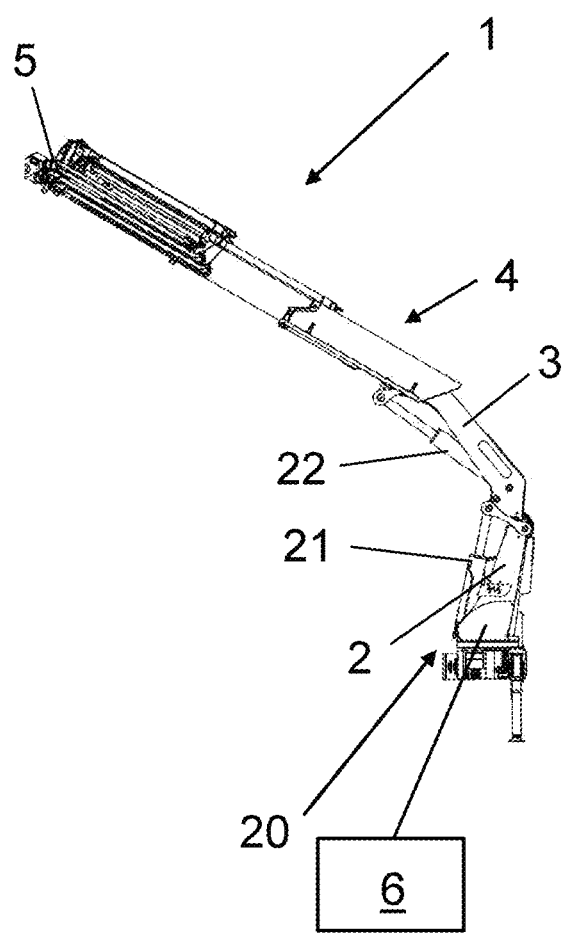
FIGS. 2a to 2c are side views of different embodiments of a lifting device.
Figure 2B:
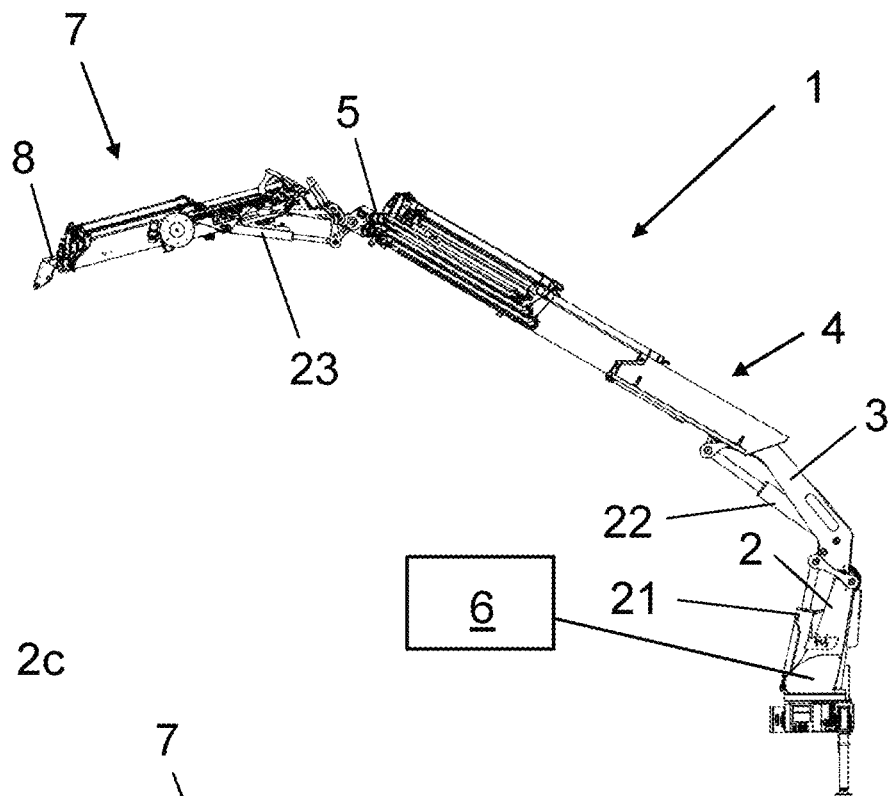
Figure 2C:
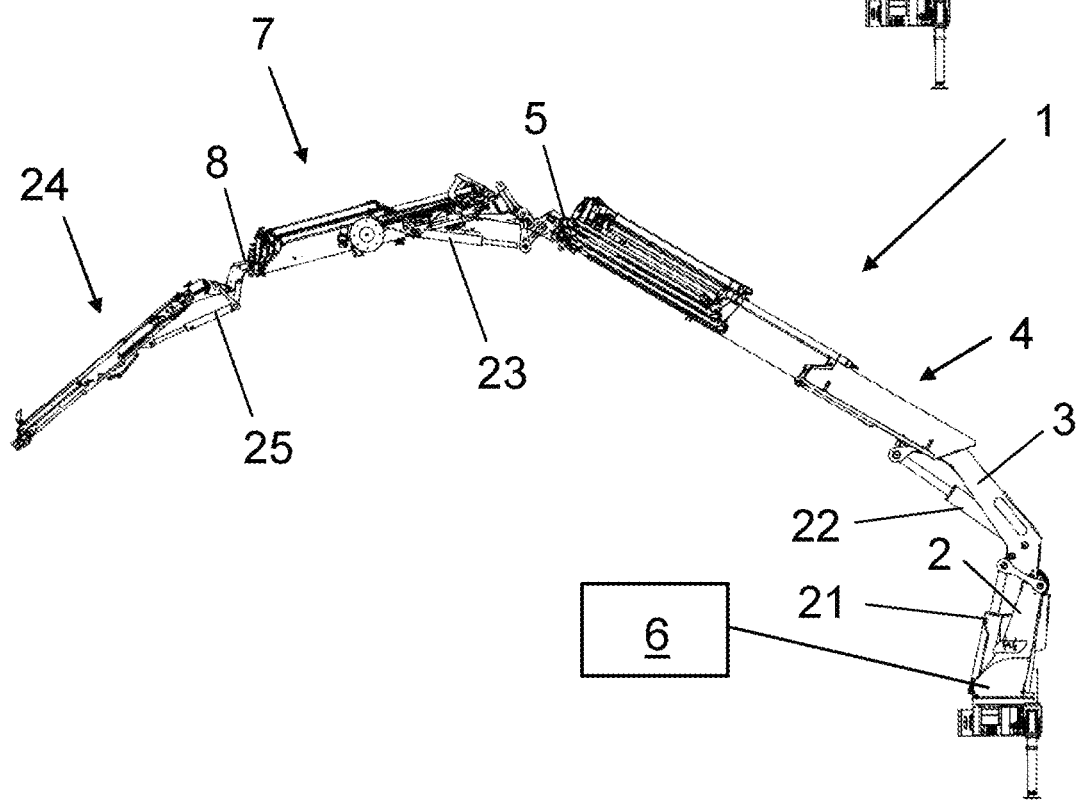

FIGS. 1a to 1c show side views of various embodiments of a lifting device 1 mounted on a vehicle 19. FIGS. 2a to 2c show the lifting devices 1 of FIGS. 1a to 1c in isolation. The degrees of freedom $\alpha$, $\beta$, $\varphi$, $\gamma$, L, J, H of the movement of the individual arms 2, 3, 4, 5, 7, 8, 24 of the different arm systems of the lifting devices 1 are illustrated in FIGS. 3a to 3e and in FIG. 4.

FIG. 1a shows a first embodiment of a proposed lifting device 1, wherein the lifting device 1 is designed as a loading crane or articulated boom crane and is arranged on a vehicle 19. As shown, the lifting device 1 has a crane column 2 which can be rotated about a first vertical axis v1 by means of a slewing gear 20, a main arm 3 which is mounted on the crane column 2 so as to be pivotable about a first horizontal pivot axis h1, and an articulated arm 4 with at least one sliding arm 5 which is mounted on the main arm 3 so as to be pivotable about a second horizontal pivot axis h2. A hydraulic main cylinder 21 is provided for pivoting the main arm 3 relative to the crane column 2 (illustrated articulation angle position a1 of the degree of freedom $\alpha$). A hydraulic articulating cylinder 22 is provided for pivoting the articulated arm 4 relative to the main arm 3 (illustrated articulation angle position b1 of the degree of freedom $\beta$). In this embodiment of the lifting device 1, the crane tip 14 can be formed by the tip of the sliding arm 5.

The actuators can basically be designed in the form of hydraulic cylinders or corresponding electric drives.

The arm system of the lifting device 1 shown accordingly has a crane column 2, a main arm 3, an articulated arm 4 and at least one sliding arm 5.

The lifting device 1 has a schematically illustrated controller 6 which is designed to carry out a method according to the invention for moving a lifting device 1.

FIG. 1b shows a second embodiment of a proposed lifting device 1, wherein the lifting device 1 shown therein, in addition to the equipment of the embodiment shown in FIG. 1a, has a second articulated arm 7 arranged on the sliding arm 5 of the articulated arm 4 so as to be pivotable about a third horizontal pivot axis h3, with a second sliding arm 8 mounted therein. A folding cylinder 23 is provided for pivoting the second articulated arm 7 relative to the articulated arm 4 (illustrated articulation angle position g1 of degree of freedom $\gamma$). In this embodiment of the lifting device 1, the crane tip 14 can be formed by the tip of the sliding arm 8.

The arm system of the lifting device 1 shown in FIG. 1b therefore has a crane column 2, a main arm 3, an articulated arm 4 with at least one sliding arm 5, and a second articulated arm 7 with at least one sliding arm 8.

Similarly to the embodiment of FIG. 1b, the lifting device 1 shown in FIG. 1b can have a controller 6, shown here only schematically, which is designed to carry out a method according to the invention for moving a lifting device 1.

FIG. 1c shows a third embodiment of a proposed lifting device 1, wherein the lifting device 1 shown therein has, in addition to the configuration of the embodiment shown in FIG. 1b, a further articulated arm 24 which is attached to the second sliding arm 8 of the second articulated arm 7 so as to be pivotable about a fourth horizontal pivot axis a4. A folding cylinder 25 is provided for pivoting the further articulated arm 24 relative to the second articulated arm 7 (illustrated articulation angle position d1 of the degree of freedom of the pivoting movement of the further articulated arm 24). In this embodiment of the lifting device 1, the crane tip 14 can be formed by the tip of the further articulated arm 24.

The arm system of the lifting device 1 shown in FIG. 1c accordingly has a crane column 2, a main arm 3, an articulated arm 4 with at least one sliding arm 5, a second articulated arm 7 with at least one sliding arm 8 as well as a further articulated arm 24 (which can optionally be variable in length).

Similarly to the embodiment of FIGS. 1a and 1b, the lifting device 1 shown in FIG. 1c can have a controller 6, shown here schematically, which is designed to carry out a method according to the invention for moving a lifting device 1.

All embodiments shown can of course have a rotating gear 20.

FIGS. 2a to 2c each show a detailed view of a lifting device 1 designed according to FIGS. 1a to 1c.

In FIGS. 3a to 3e, the degrees of freedom $\alpha$, $\beta$, $\varphi$, $\gamma$, L, J of the movement of different arms of different arm systems are illustrated in side views.

Figure 3A:
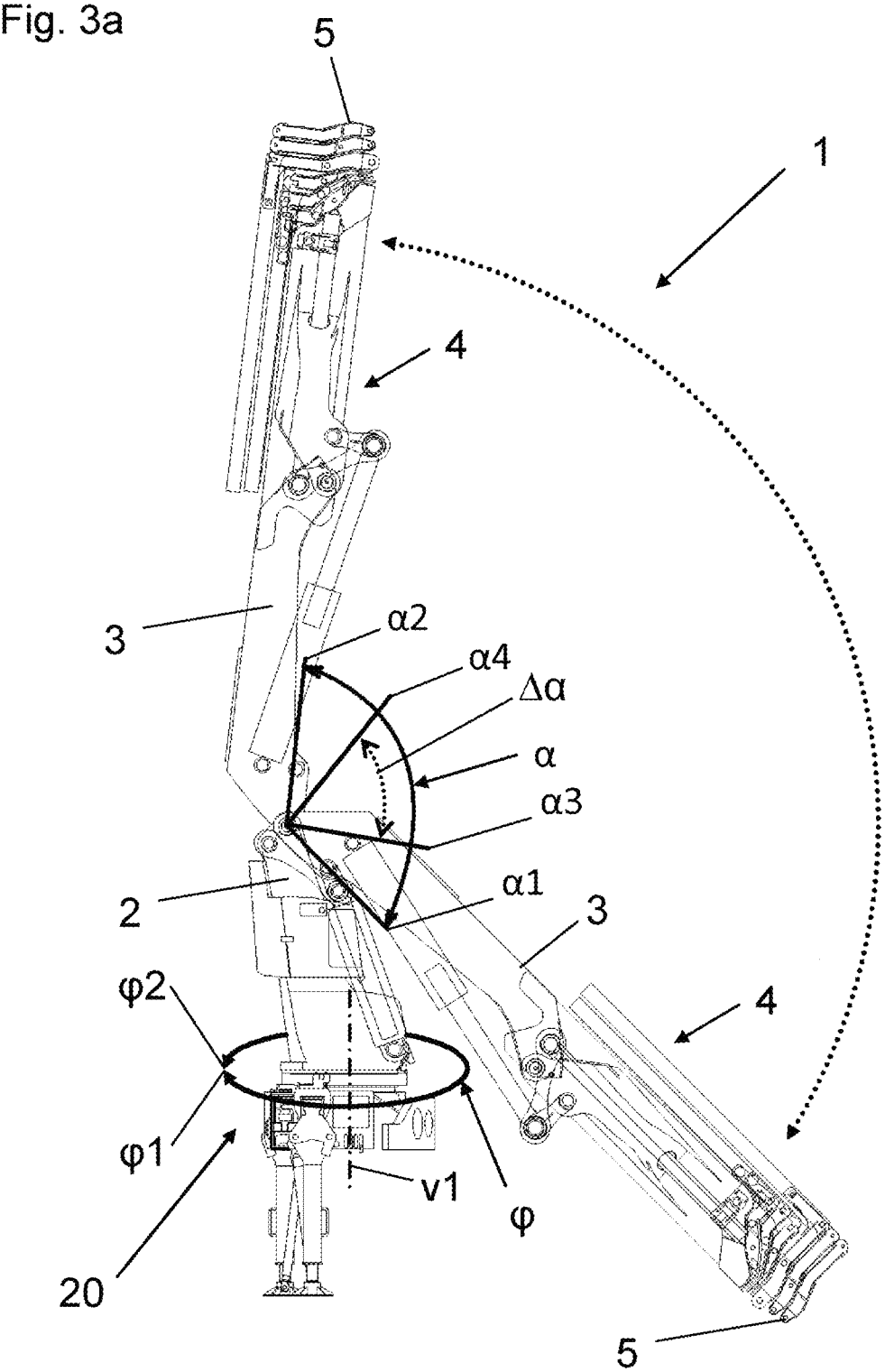
FIGS. 3a to 3e are side views of degrees of freedom of movement of different arms of different arm systems.
Figure 3B:
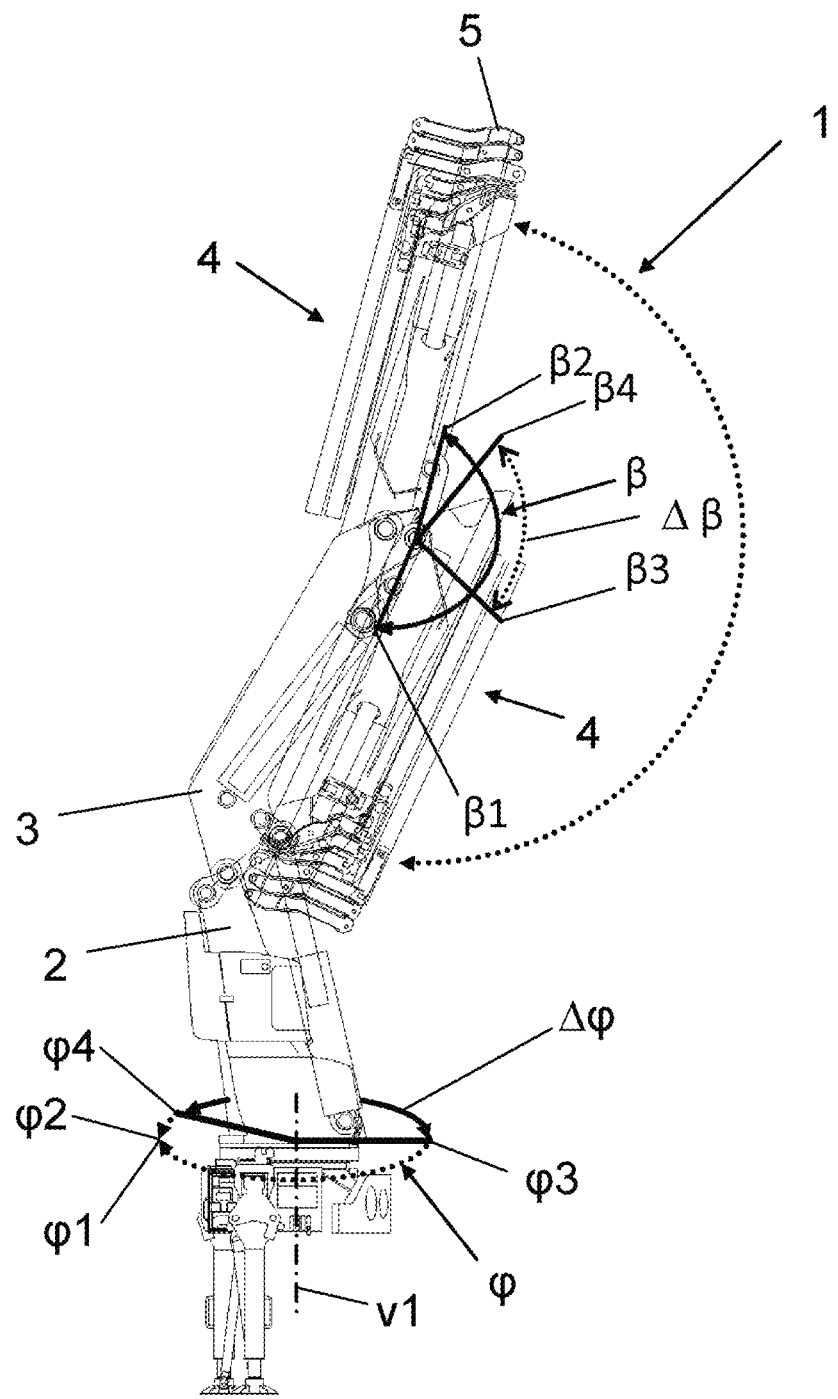
Figure 3C:
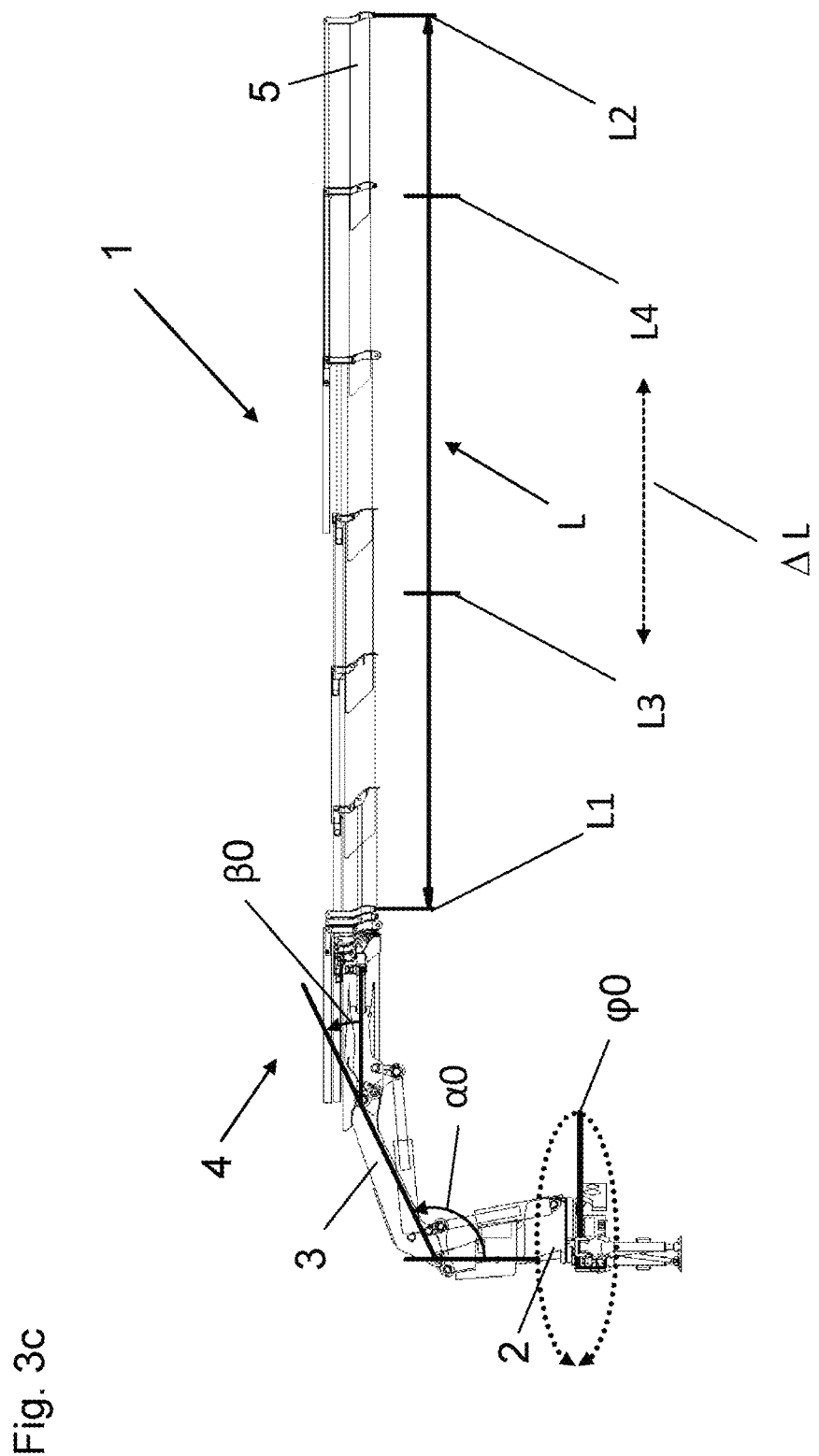

The lifting device 1 shown in FIGS. 3a to 3c corresponds to the embodiment of FIGS. 1a and 2a. The articulated arm 7 shown in FIGS. 3d and 3e corresponds to that of the second articulated arms 7 in FIGS. 1b and 2b. The further articulated arm 24 of FIGS. 1c and 2c can also be designed corresponding to the articulated arm 7 shown in FIGS. 3d and 3e.

With reference to FIGS. 3a to 3c, the crane column 2, which can be rotated about the rotation axis in the form of the first vertical axis v1, is pivotably mounted over a structurally predetermined crane column pivot range $\varphi 1$-$\varphi 2$ and has a degree of freedom $\varphi$ due to its pivotable mounting (FIG. 3c shows the value of the pivot position $\varphi 0$ of the degree of freedom $\varphi$). It is conceivable that the crane column pivot range extends over an interval of 0° to 360°, i.e. the crane column is designed to be endlessly pivotable. The main arm 3 is pivotably mounted on the crane column 2 over a structurally predetermined main arm pivot range $\alpha 1$-$\alpha 2$ and has a degree of freedom $\alpha$ due to its pivotable mounting (FIG. 3c shows the value of the pivot position $\alpha 0$ of the degree of freedom $\alpha$). The articulated arm 4 is pivotally mounted on the main arm 3 over a structurally predetermined articulated arm pivot range $\beta 1$-$\beta 2$ and has a degree of freedom $\beta$ due to its pivotable mounting. The sliding arm 5 is mounted in the articulated arm 4 so that it can move over a structurally predetermined sliding range L1-L2 and has a degree of freedom L due to its sliding mounting.

Figure 3D:
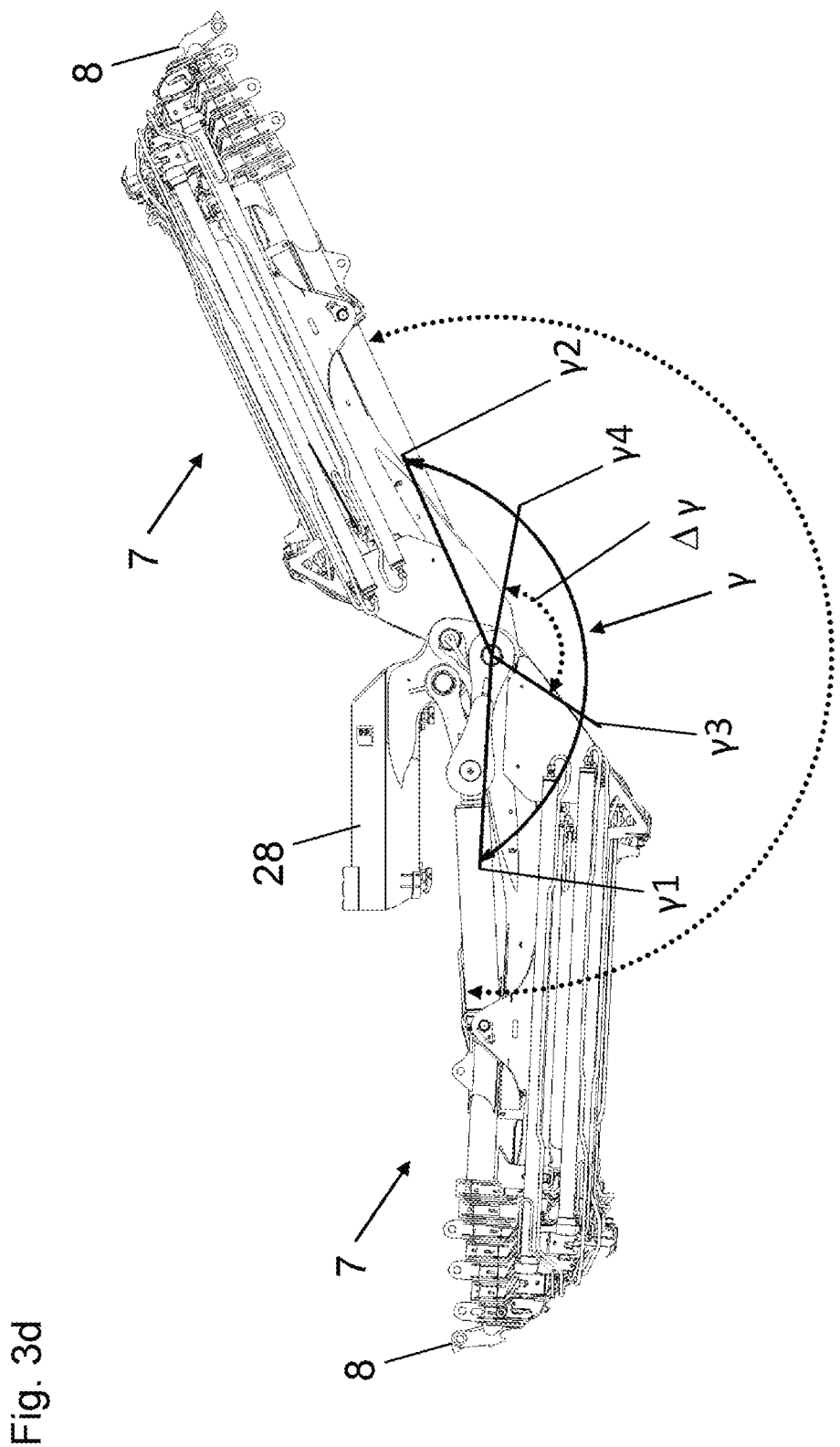
Figure 3E:
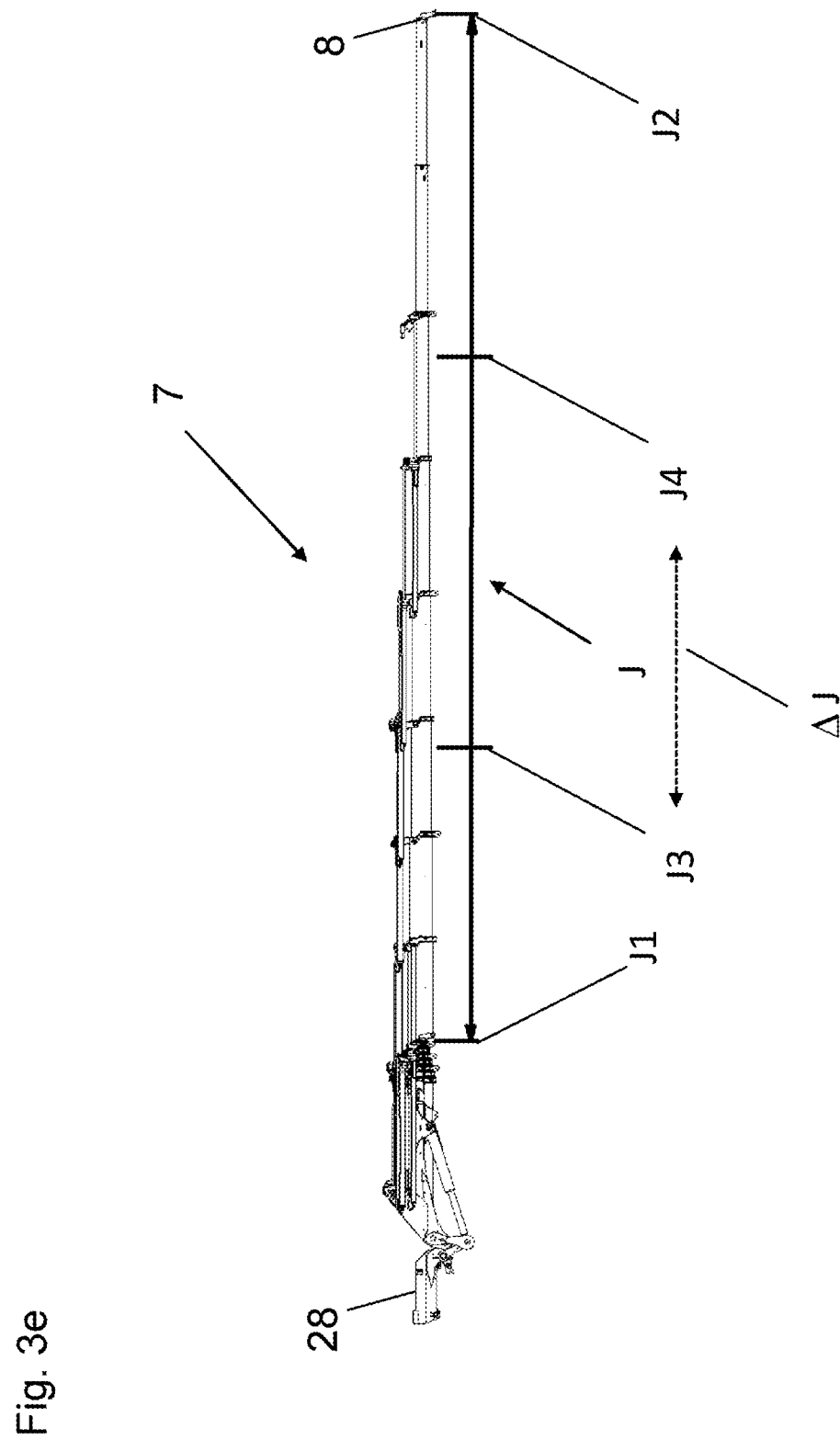

FIGS. 3d and 3e show an isolated articulated arm 7 which can be pivotally mounted via a connecting region 28 on the sliding arm 5 of the lifting device 1 of FIGS. 3a to 3c over a structurally predetermined second articulated arm pivoting range $\gamma 1$-$\gamma 2$ and has a degree of freedom $\gamma$ due to a pivotable mounting, and which comprises at least one second sliding arm 8 which is displaceably mounted in the second articulated arm 7 over a structurally predetermined second sliding arm sliding range J1-J2 and has a degree of freedom J due to its displaceable mounting.

Figure 4:
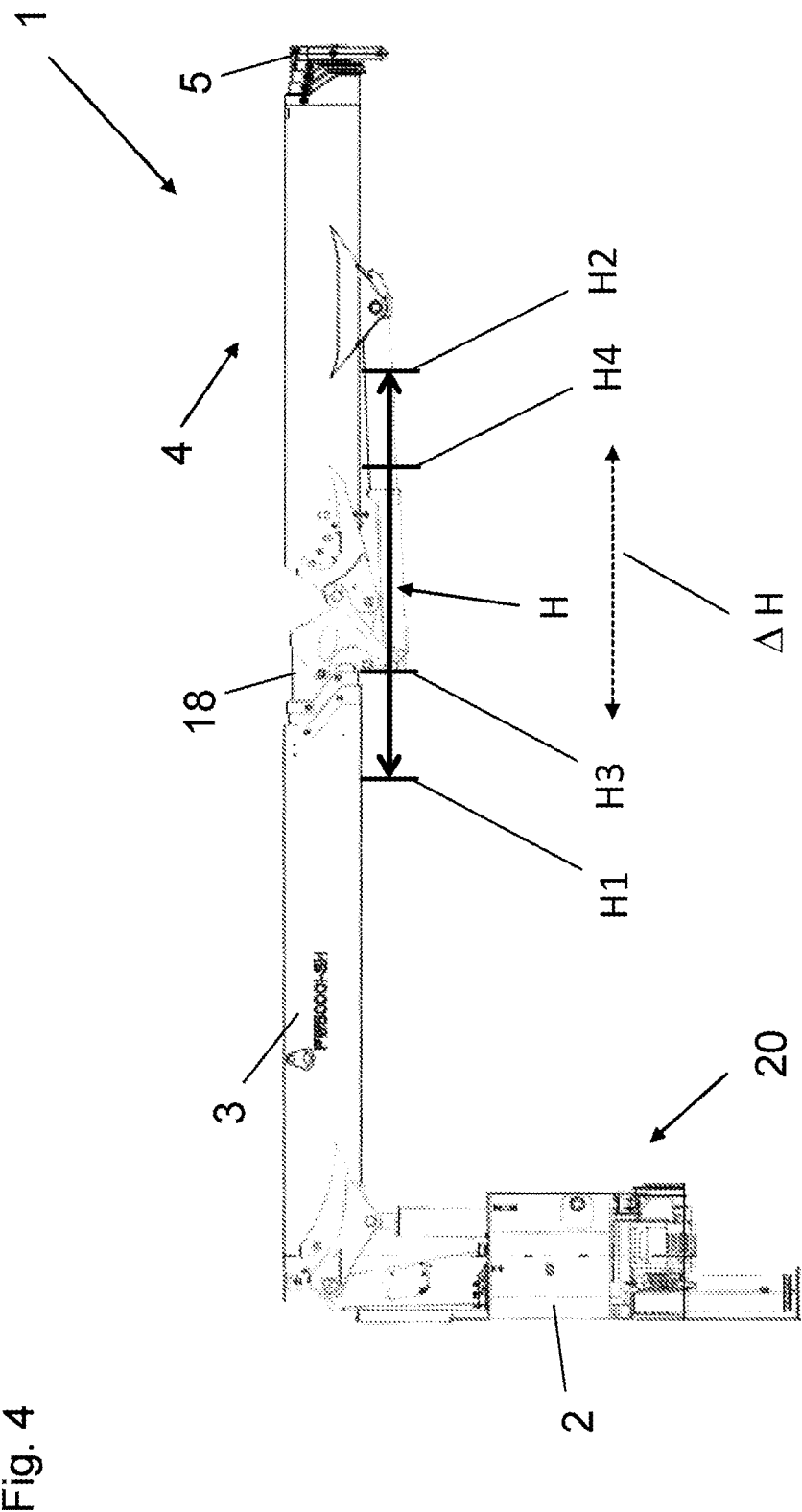
FIG. 4 shows an embodiment of a lifting device with a length-adjustable main arm.

FIG. 4 shows an embodiment of a lifting device 1, the arm system of which, in contrast to the previously discussed embodiments, additionally has at least one main arm sliding arm 18, which is displaceably mounted in the main arm 3 over a structurally predetermined (and only schematically shown) sliding range H1-H2 and has a degree of freedom H due to its sliding mounting.

The arm system of the lifting device 1 shown in FIG. 4 therefore has a crane column 2, a main arm 3 with at least one main arm sliding arm 18, and an articulated arm 4 with at least one sliding arm 5.

Similarly to the previously described embodiments, the lifting device 1 shown in FIG. 4 can have a schematically illustrated controller 6 which is designed to carry out a method according to the invention for moving a lifting device 1.

Figure 5A:
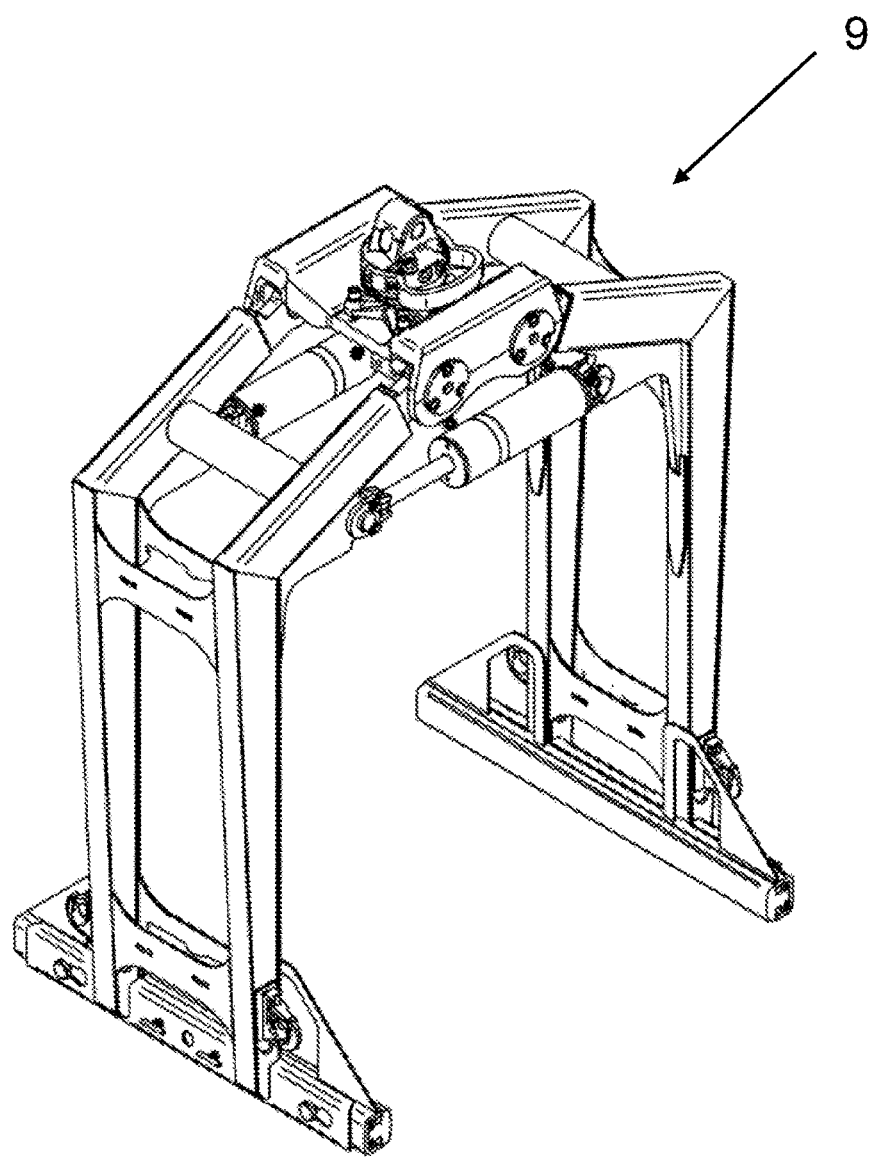
FIGS. 5a and 5b show two embodiments of additional devices that can be arranged on the arm system.
Figure 5B:
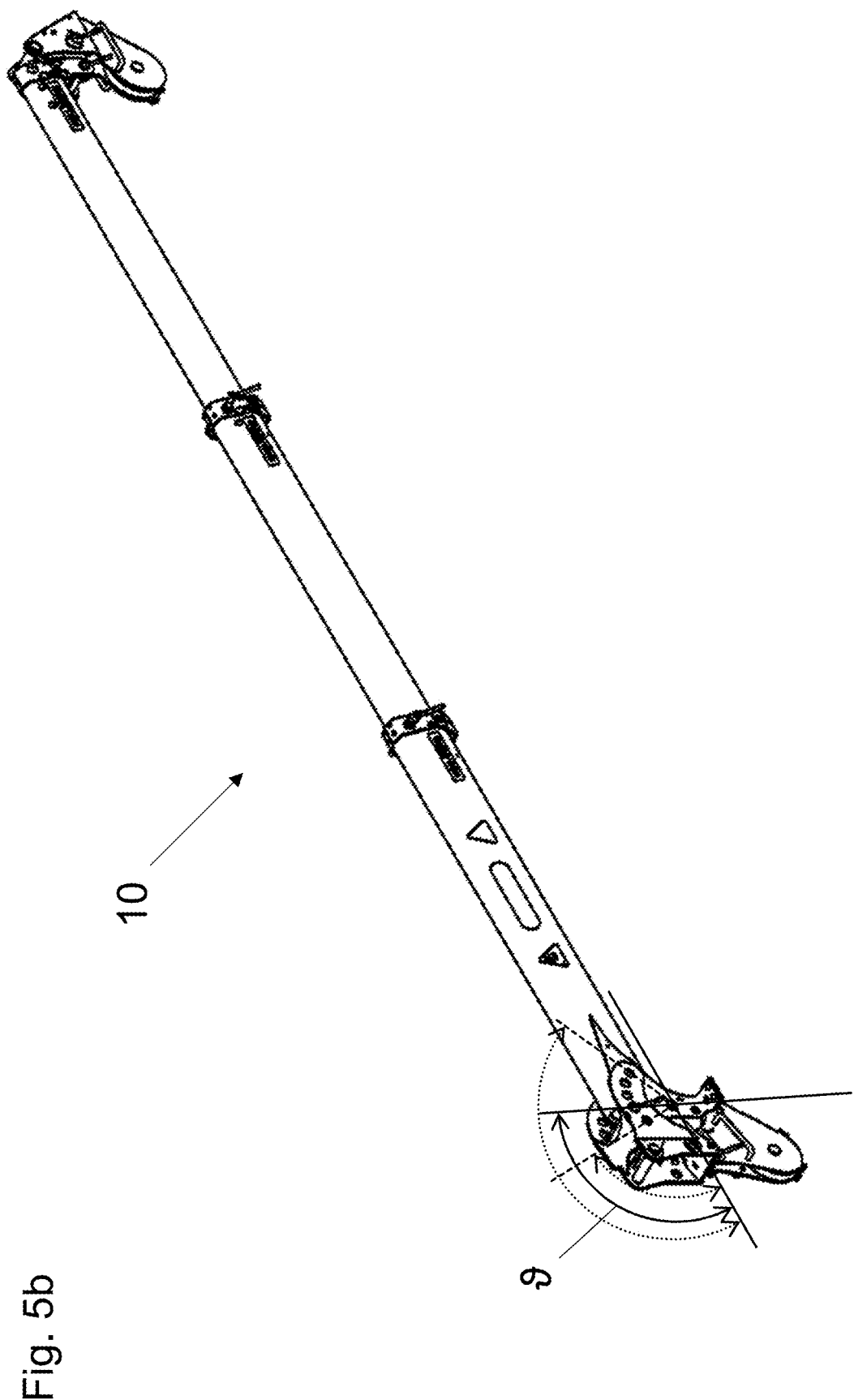

FIGS. 5a and 5b show two embodiments of additional devices that can be arranged on the arm system in the form of a working device 9 designed as a stone stacking tongs and a static arm extension 10. Generally, a sensor-based geometry detection of the at least one additional device 9, 10 can be carried out on the basis of at least one degree of freedom of the geometry of the additional device 9, 10, for example for variable distances or angles of movable parts of the additional device. It is also possible for a user to provide corresponding information via a corresponding user interface of the controller 6.

FIG. 5a shows an embodiment of a working device 9 which can be arranged on a sliding arm 5 of a lifting device 1. Dimensions and functional scope of the working device 9 can be stored in a controller 6 (not shown here) and included in the calculations of the controller 6.

The static arm extension 10 shown in FIG. 5b can be arranged on a sliding arm 5 of a lifting device 1 via a corresponding holder. By means of an adjustable holder, the arm extension 10 can be arranged at an angle 9 (shown here opposite an imaginary vertical angle) on a sliding arm 5. The arm extension 10 can be designed to be adjustable in length. The information on the arm extension 10, such as the length of the arm extension 10 and the angle 9, can be stored in a controller 6 not shown here, for example by presetting or detecting, and included in calculations of the controller 6.

Figure 6A:
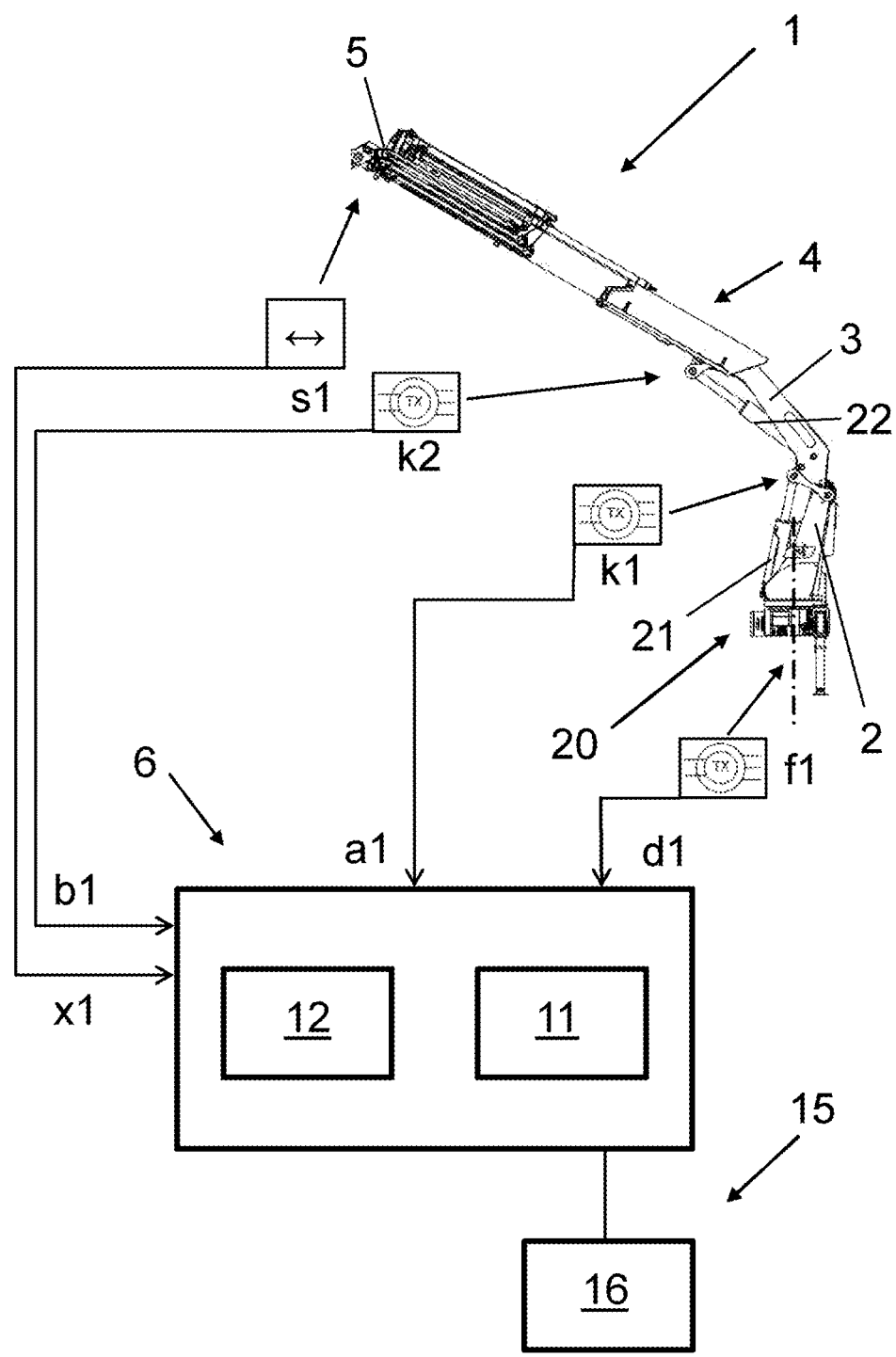
FIGS. 6a to 6c are side views of various embodiments of a lifting device and a schematic representation of a control system with sensors.

FIG. 6a shows an embodiment of the lifting device 1 according to FIG. 1a or 2a. In addition, a schematic representation of the controller 6 is shown, which can be configured to carry out a method according to the invention for moving a lifting device 1.

The controller 6 shown schematically here has several signal inputs to which signals from the sensors installed on the lifting device 1 can be fed. Furthermore, the controller 6 has a memory 11 in which, for example, program data on operating modes and calculation models of the controller 6 as well as incoming signals can be stored, and a computing unit 12 with which, among other things, incoming signals and data stored in the memory 11 can be processed. The controller 6 may also comprise a display 16. Communication between the controller 6 and the display 16 can be wired and/or wireless. The sensor system for detecting the geometry of the lifting device 1 in the embodiment shown in FIG. 6a comprises a rotation angle sensor f1 for detecting the rotation angle f1 of the crane column 2, a bending angle sensor k1 for detecting the bending angle a1 of the main arm 3 to the crane column 2, a bending angle sensor k2 for detecting the bending angle b1 of the bending arm 4 to the main arm 3 and a sliding position sensor s1 for detecting the sliding position x1 of the sliding arm 5.

Figure 6B:
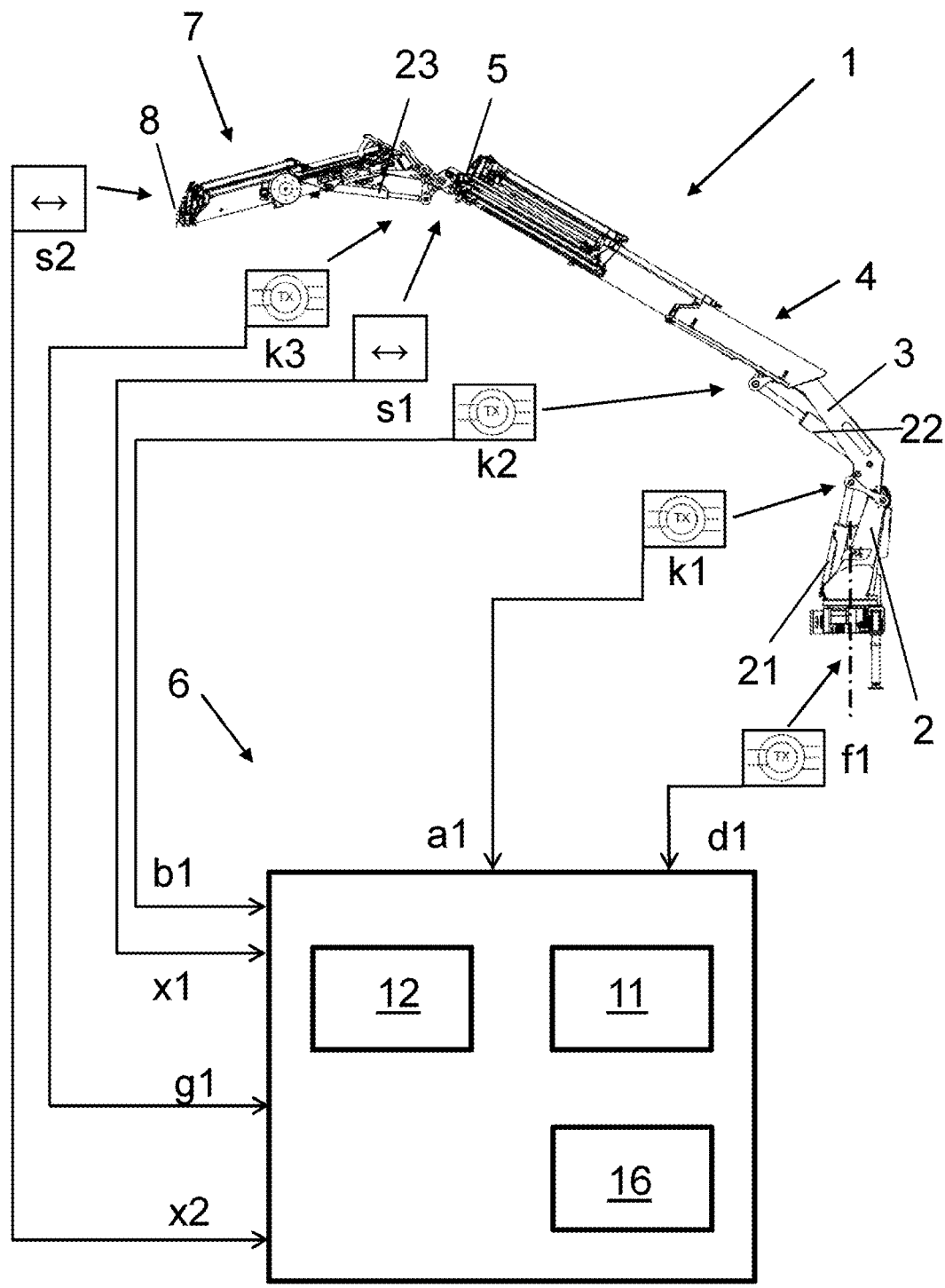

In FIG. 6b, analogously to FIG. 6a, an embodiment of the lifting device 1 according to FIG. 1b or 2b is shown. The configuration of the lifting device 1 comprises, as shown, a second articulated arm 7 arranged on the sliding arm 5 of the articulated arm 4. As additional sensors for detecting the operating parameters of the lifting device 1, a bending angle sensor k3 for detecting the bending angle g1 of the second articulated arm 7 to the articulated arm 5 and a push position sensor s2 for detecting the push position x2 of the second sliding arm 8 are provided.

An analogous embodiment of the arrangement shown in FIGS. 6a and 6b comprising a lifting device 1 according to FIG. 1c or 2c and a control system 6 is also conceivable.

Figure 6C:
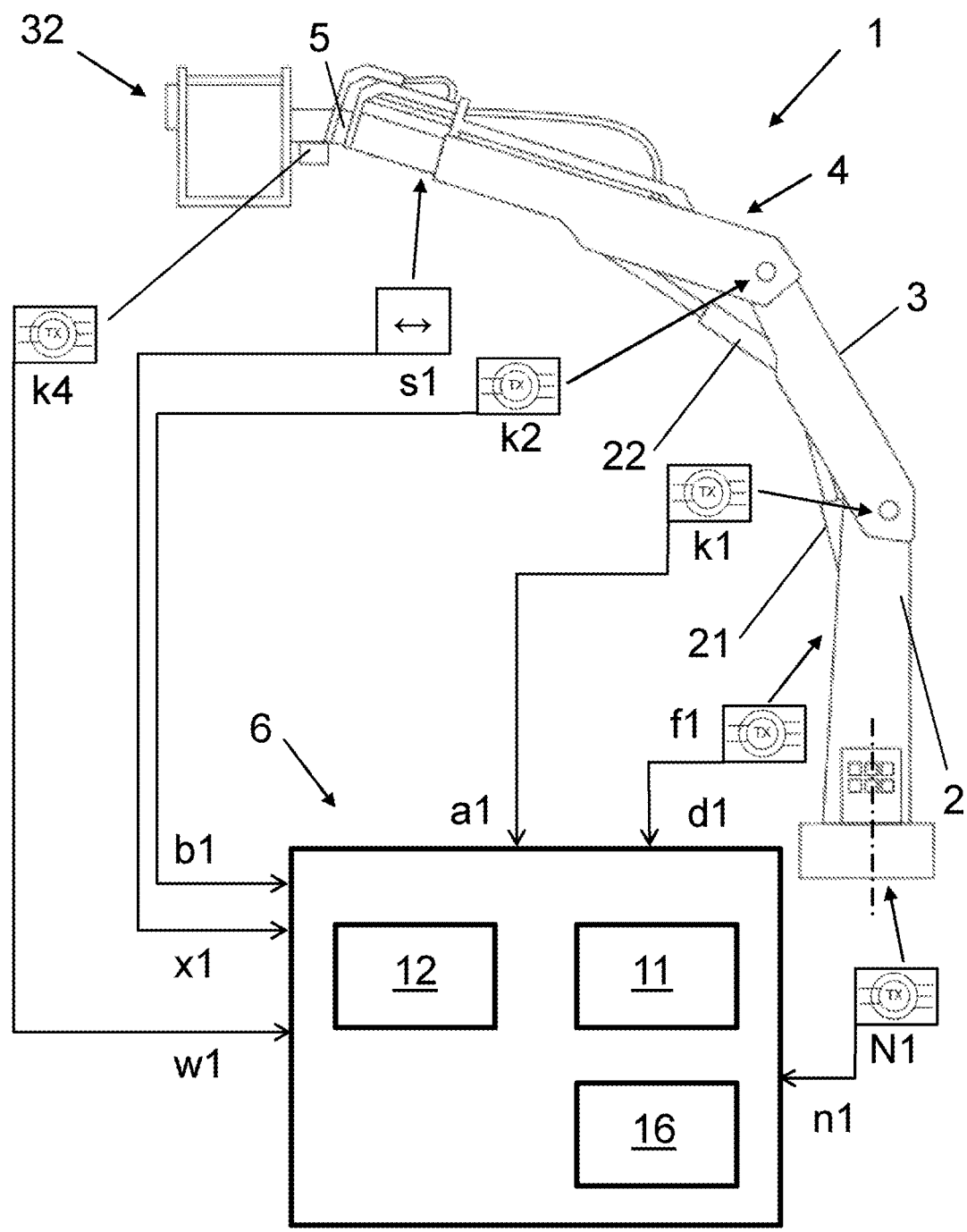

In FIG. 6c, analogous to FIG. 6a, an embodiment of the lifting device 1 according to FIG. 1b or 2b is shown.

An inclination angle sensor N1 is provided to detect an inclination angle n1 of the lifting device 1.

An inclination angle sensor N1 can basically be provided for all shown embodiments of the lifting device 1.

On the lifting device 1 in the form of a lifting platform shown in FIG. 6c, an additional device in the form of a work cage 32 is arranged on a sliding arm 5 of the articulated arm 4. By means of an articulation angle sensor k4 for detecting the angle w1 of the work cage 32, for example relative to one of the three spatial directions, a position of the work cage 32 relative to the arm system of the lifting device 1 can be detected. Information on the range of functions, dimensions and angular positions of the additional device in the form of the work cage 32 can be stored in a memory 11 of the controller 6.

A position of the work cage 32, or generally of an additional device, relative to the arm system of the lifting device 1, which position is detected in a measuring phase and/or specified in a presetting phase, can be included in the determination of a geometric deviation in the comparison phase.

Figure 8A:
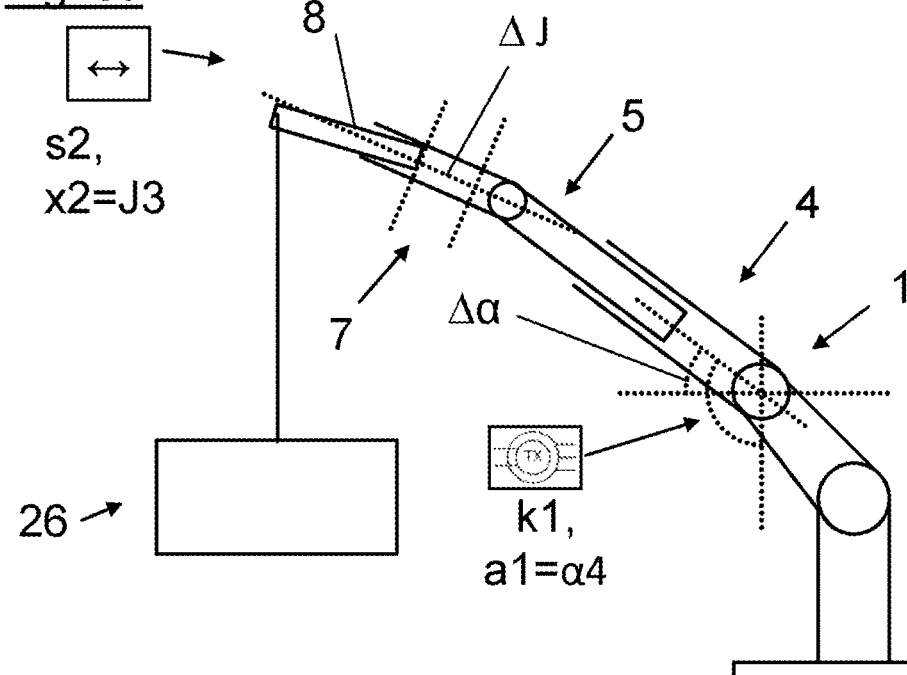
FIGS. 8a and 8b are schematic views of a lifting device to illustrate a deflection of an arm and an inclination of the lifting device relative to the horizontal.
Figure 8B:
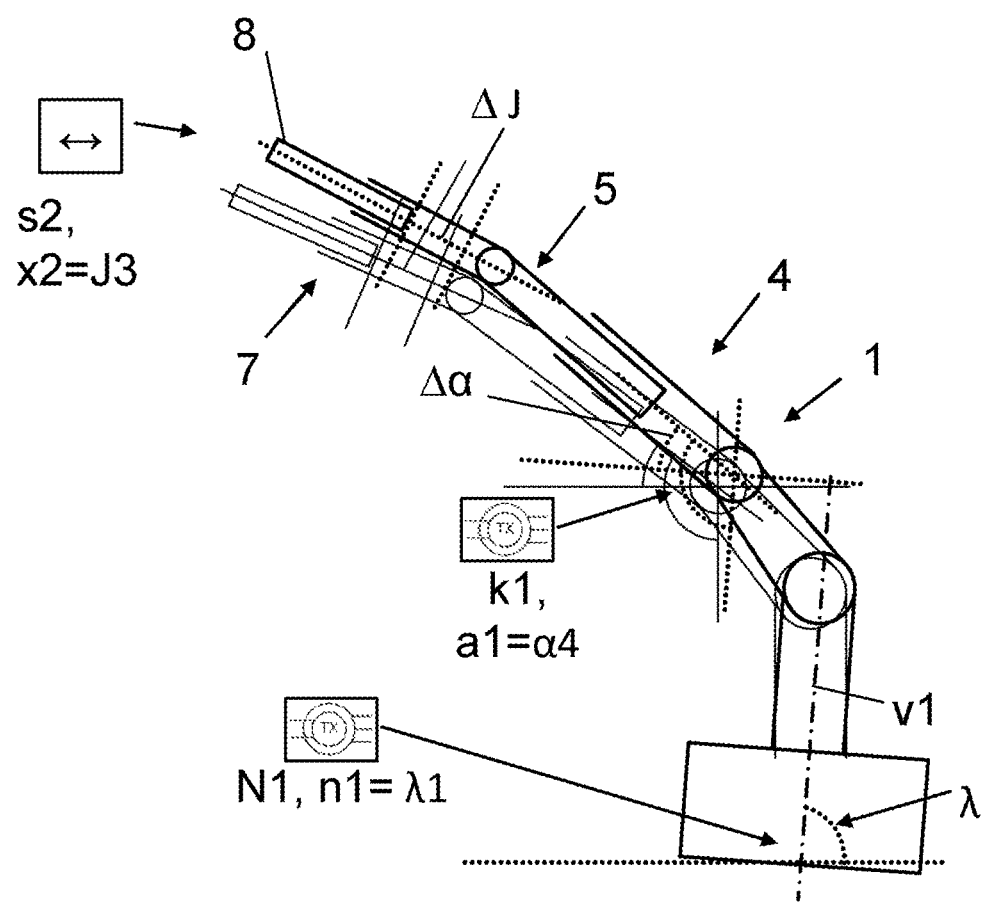

The relationships between the values of the angles and the degrees of freedom α, β, φ, γ of the angles and the values of the sliding positions and the degrees of freedom L, J, H of the sliding positions, as well as values of the inclination and the inclination angle λ are provided in the figures as follows:

| | | | |
|---|---|---|---|
| Angle a1 | Sensor k1 | Values α0, α1, α2, α3, α4 | FIG. 3a |
| Angle b1 | Sensor k2 | Values β1, β2, β3, β4 | FIG. 3b |
| Angle g1 | Sensor k3 | Values γ1, γ2, γ3, γ4 | FIG. 3d |
| Angle d1 | Sensor f1 | Values φ0, φ1, φ2, φ3, φ4 | FIG. 3a |
| Angle n1 | Sensor N1 | Value λ1 | FIG. 8b |
| Position x1 | Sensor s1 | Values L1, L2, L3, L4 | FIG. 3c |
| Position x2 | Sensor s2 | Values J1, J2, J3, J4 | FIG. 3e |

In FIGS. 3a, 3b, 3c, 3d, 3e and in FIG. 4, in addition to the structurally predetermined ranges of the degrees of freedom α, β, φ, γ, L, J, H of the arm system, different intermediate positions for the arms 2, 3, 4, 5, 7, 8, 18 of the arm system are schematically shown as examples:

Intermediate positions φ3, φ4 of the pivot angle of crane column 2

Intermediate positions α2, α3 of the pivot angle of the main arm 3

Intermediate positions β2, β3 of the pivot angle of the articulated arm 4

Intermediate positions γ2, γ3 of the pivot angle of the second articulated arm 7

Intermediate positions L2, L3 of the sliding positions of the sliding arm 5

Intermediate positions J2, J3 of the sliding positions of the second sliding arm 8

Intermediate positions H2, H3 of the sliding positions of the main arm sliding arm 18

Different and advantageously essentially freely selectable intermediate positions of the arms 2, 3, 4, 5, 7, 8, 18 of the arm system within the structurally predetermined ranges can correspond to different geometries of the arm system. Different geometries can be compared based on the degrees of freedom α, β, φ, γ, L, J, H of the arm system. Consequently, a geometry deviation can be determined qualitatively and quantitatively based on the degrees of freedom α, β, φ, γ, L, J, H of the arm system.

For example, a target position can be specified by the values of the pivot angles φ2, α2, β2, γ2, and sliding positions L2, J2, H2. This can be done by detecting the instantaneous geometry of the arm system and/or by specifying the geometry of the arm system via a user interface of the controller 6 in a presetting phase.

In a position of the arm system of the lifting device 1 deviating from a target position, the geometry can be characterized by the values of the pivot angles φ3, α3, β3, γ3, and sliding positions L3, J3, H3. This can be done in a measuring phase by detecting the instantaneous geometry of the arm system based on the degrees of freedom α, β, φ, γ, L, J, H of the arm system. The lifting device 1 can be brought into a position deviating from said target position, which is preferably essentially freely selectable, by controlling actuators 20, 21, 22, 23, 25.

By comparison, for example simply by forming the difference, of the respective values, for example preset and/or detectable via sensors (see, for example, FIGS. 6a and 6b), of the pivot angles φ3, φ4, α2, α3, β2, β3, γ2, γ3 and sliding positions L2, L3, J2, J3, H2, H3 existing in different geometries of the arm system, a respective geometry deviation Δα, Δβ, Δφ, Δγ, ΔL, ΔJ, ΔH along the corresponding degree of freedom α, β, φ, γ, L, J, H of the arm system can be determined for a target position selected in a selection phase. This can be done in a comparison phase.

On the basis of the geometric deviation Δα, Δβ, Δφ, Δγ, ΔL, ΔJ, ΔH determined in the comparison phase, at least one control command can be given for controlling at least one of the actuators 20, 21, 22, 23, 25 of the lifting device 1. The control command or the control commands can be used to approach or at least partially transfer the arm system of the lifting device 1 from the geometry detected in the measuring phase to the geometry of the at least one target position selected in the selection phase.

In a control phase, the lifting device 1 can be at least partially moved into the selected target position by controlling the corresponding actuators 20, 21, 22, 23, 25 of the arm system with the at least one control command generated in the generation phase.

Figure 7A:
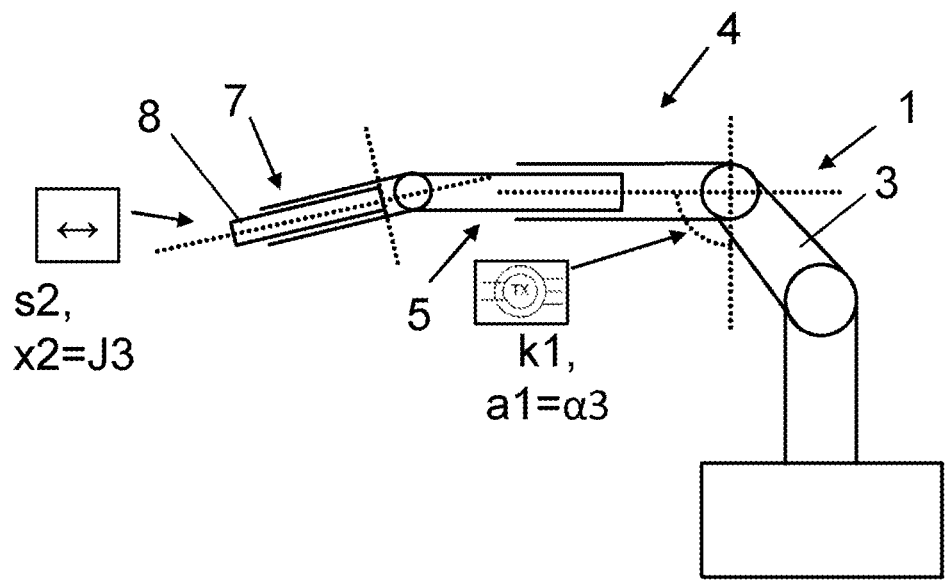
FIGS. 7a and 7b are schematic views of a lifting device in different positions of the arm system.
Figure 7B:
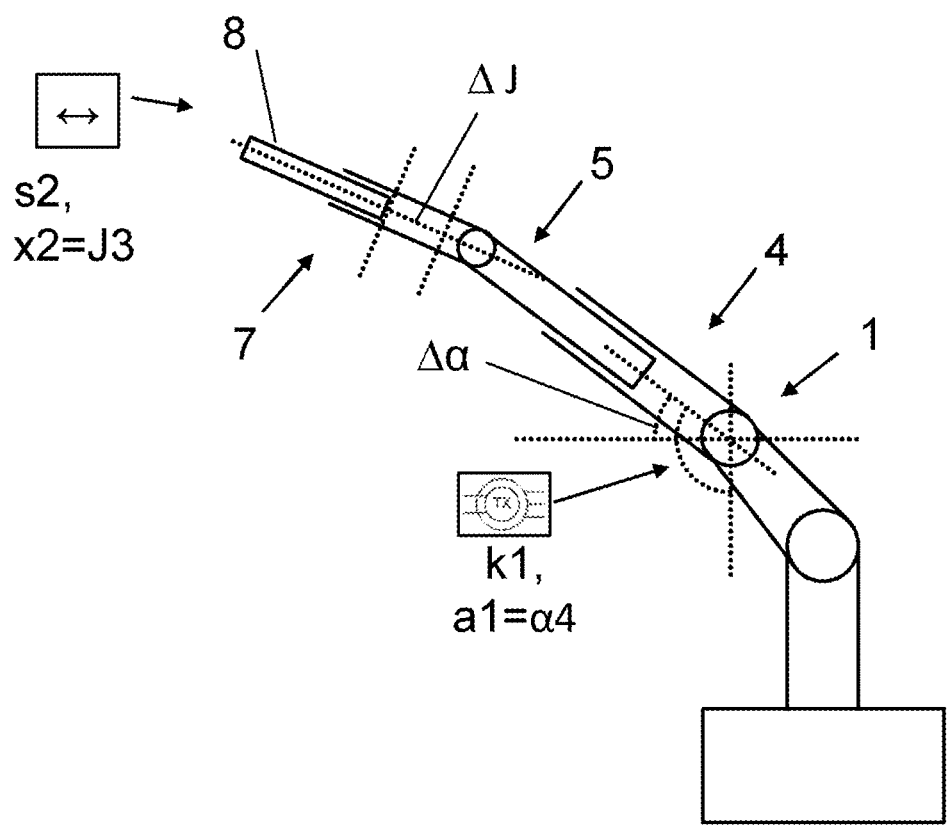

FIGS. 7a and 7b show a schematic embodiment of a lifting device 1 according to FIGS. 2b and 6b in different positions.

In FIG. 7a, the arm system of the lifting device 1 is in a position which can correspond to an exemplary target position. In a presetting phase, the instantaneous geometry of the arm system can be detected on the basis of the degrees of freedom α, B, q, Y, L, J. For the sake of simplicity, only the values α3 of the pivot angle of the main arm 2 and J3 of the sliding position of the second sliding arm 8 detected by means of the articulation angle sensor k1 and the sliding position sensor s2 are shown.

In FIG. 7a, the arm system of the lifting device 1 is in a position which can correspond to an exemplary, essentially freely selectable position of the lifting device from which a user wants to move the lifting device 1 into the target position of FIG. 7a using a method according to the invention. A user can correspondingly select the target position in a selection phase.

In a measuring phase, the instantaneous geometry of the arm system in the position shown in FIG. 7b can be detected using the installed sensors. In the position shown, there is essentially a change in the pivot angle of the main arm 2 and a change in the sliding position of the second sliding arm 8 compared to the target position. By means of the articulation angle sensor k1 and the sliding position sensor s2, corresponding values α4 of the pivot angle of the main arm 2 and J4 of the sliding position of the second sliding arm 8 can be detected.

In a comparison phase, a geometry deviation Δα, ΔJ can be determined by comparing the respective geometries.

In a generation phase, at least one control command for controlling at least one of the actuators 20, 21, 22, 23, 25 of the lifting device 1 can be generated by a computing unit configured for this purpose on the basis of the geometric deviation Δα, ΔJ determined in the comparison phase. In the exemplary embodiment, at least two control commands can be generated for the actuators of the pivot angle of the main arm 2 and the sliding position of the second sliding arm 8.

The at least two control commands can be issued in a control phase by the controller 6 for controlling the actuators, whereby an at least partial movement of the lifting device 1 can take place from the position of the arm system shown in FIG. 7b to the position of the arm system shown in FIG. 7a.

In order to approach or transfer the arm system, the lifting device 1 can be moved by appropriately generated control commands into a geometry that approximates the geometry of the target position within a predeterminable or preset tolerance range.

FIG. 8a shows how a load on the lifting device, for example by a picked up load 26, can cause a deflection of the arm system. The deflection is schematically represented by a deformation or deflection of the second sliding arm 8. When the instantaneous geometry of the arm system is detected and/or the geometry of the arm system is specified via a user interface of the controller 6, a deflection of the arm system can be determined on the basis of a calculation model.

In addition to the degrees of freedom α, β, φ, γ, L, J of the arm system, the geometry of the arm system can be characterized by a deflection of the arm 8 of the arm system determined in a calculation model. The deflection can be included in the comparison phase and the subsequent generation phase.

FIG. 8b shows a lifting device 1 inclined by an angle λ relative to a horizontal surface serving to support the lifting device 1. An inclination λ, here represented by the angle between the horizontal and the rotation axis v1, can cause an undesirable deviation of the position of the arm system of the lifting device 1 compared to a target position detected in an uninclined position or inclined with a deviating inclination. An inclination angle sensor N1 is provided for detecting an inclination angle n1 of the lifting device 1, wherein a value λ1 of the inclination angle n1 is shown in the figure.

The inclination λ can, for example, be stored in the controller 6 by a presetting or a detecting and included in calculations of the controller 6. By incorporating the inclination λ into a corresponding calculation model, a compensation of a geometric deviation between an instantaneously existing geometry and the geometry of at least one target position selected in the selection phase can be achieved.

With an appropriate calculation model, a more accurate approximation of the geometry of the arm system to the geometry of the at least one target position selected in the selection phase can be achieved, regardless of the currently existing inclination λ of the lifting device 1.

Figure 9A:
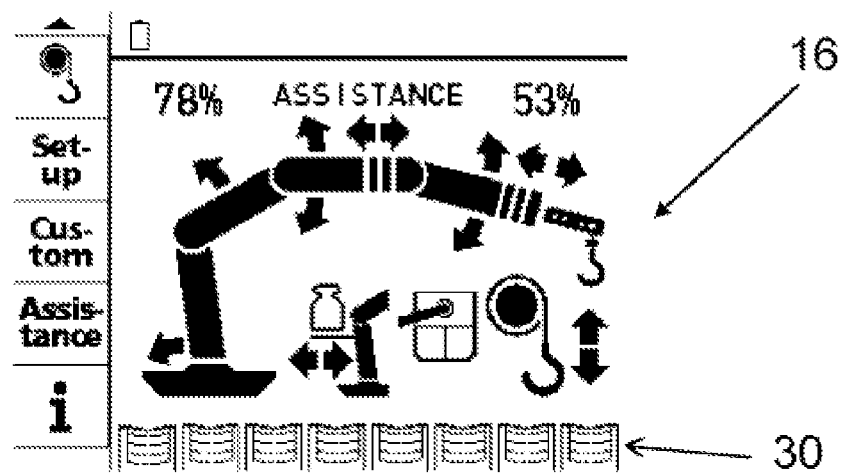
FIGS. 9a and 9b show the display of a controller of a proposed lifting device and a control panel of the controller according to FIG. 9a, FIGS. 10a to 10d show embodiments of user interfaces.

FIG. 9a shows a display 16 of a controller 6 of a proposed lifting device 1.

If the display 16 of the controller 6 is designed as a touch display, the user interface can be operated directly via the touch display.

If this display 16 is not designed as a touch display or similar, the menu-driven user interface can be navigated via an operating element 17.

The illustration shown in FIG. 9a contains graphical representations of several linear levers 30 for the visualization of operating elements 17.

Figure 9B:
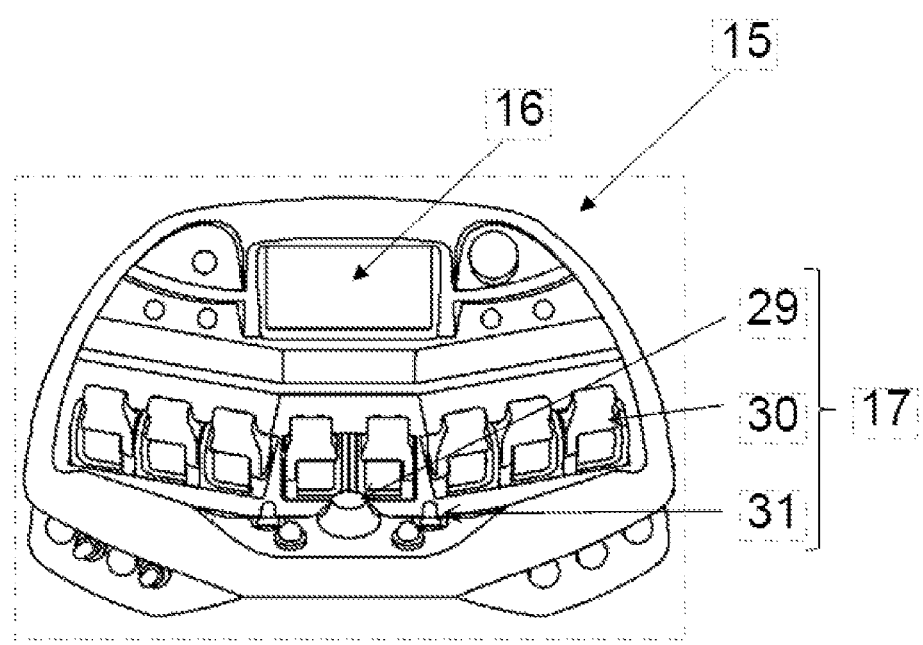

FIG. 9b shows an embodiment of a control panel 15 of the controller 6. In the embodiment shown, the control panel 15 has at least one display 16 and operating elements 17 in the form of a rotary knob 29, a linear lever 30 and a button 31. The operating elements can be used for navigating a menu-supported user interface, for selecting the functions of the lifting device 1 that can be selected by a user, in particular for specifying at least one target position, or for issuing control commands by a user.

In an embodiment of the control panel 15 according to the embodiment of the controller 6 according to FIG. 9a, the control panel 15 can have a predetermined operating element 17, for example in the form of a button 31 configured as a dead man's switch. If the controller 6 is in a sixth operating mode for the control phase as described above, the geometry of the arm system can be changed at least partially automatically by the controller 6 by actuating the operating element 17 in the form of the button 31 configured in this way. The change in geometry can be carried out as long as the operating element 17 in the form of, for example, the button 31 remains actuated by the user.

Figure 10A:
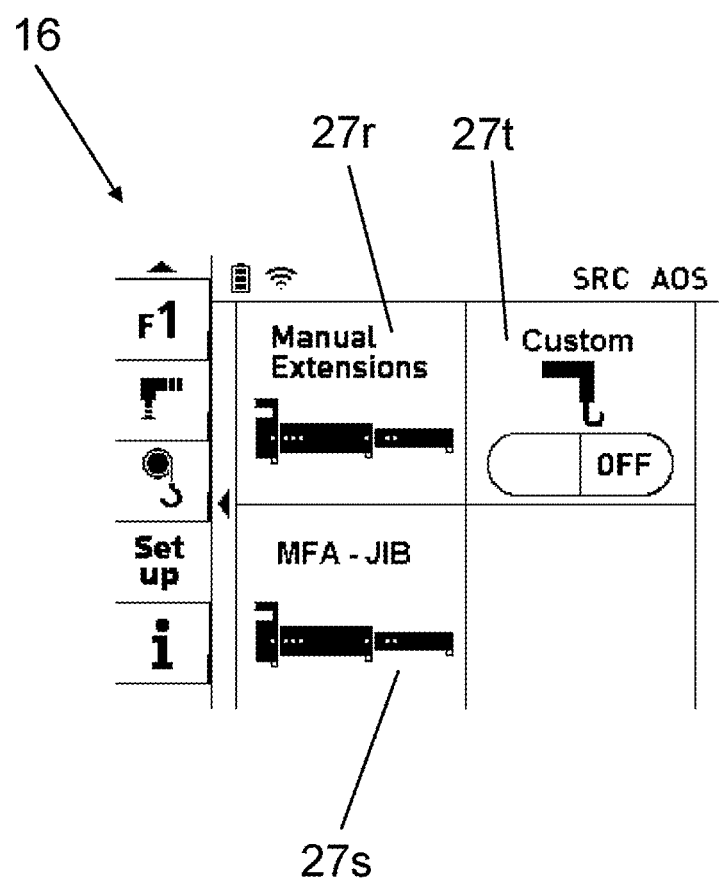
Figure 10B:
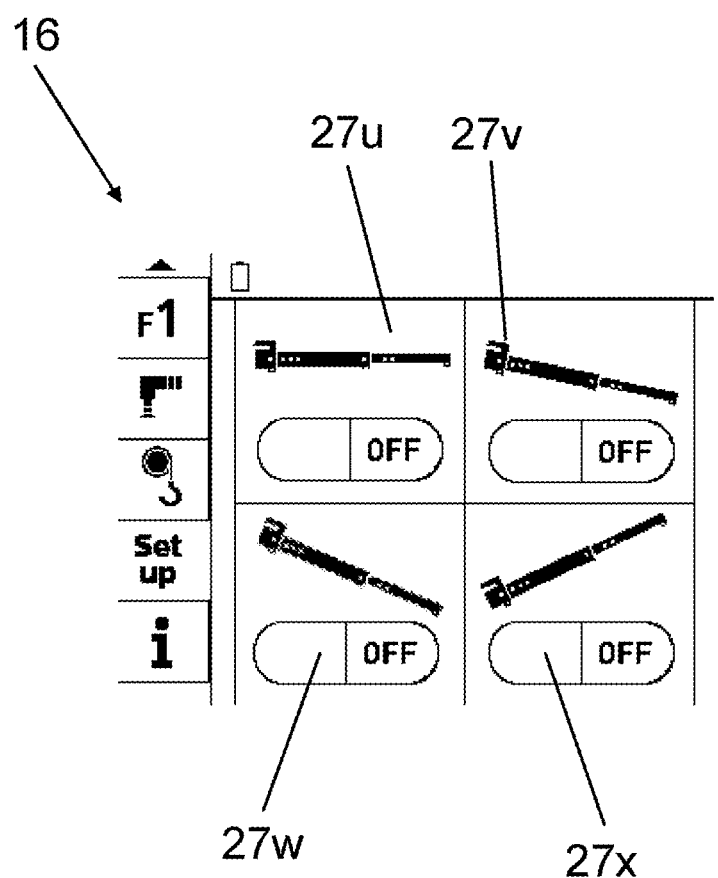
Figure 10C:
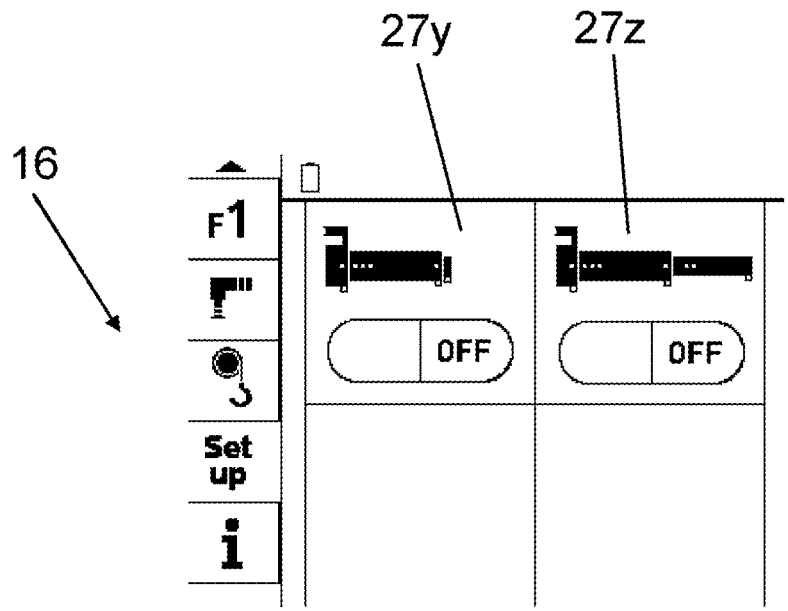

FIGS. 10a to 10c show exemplary embodiments of user interfaces, each of which is formed by displays 16 of a controller 6, which displays may be designed as a touch display. The functions 27r, 27s, 27t, 27u, 27v, 27w, 27x, 27y, 27z shown here and selectable by a user each serve to enter and/or detect information about an additional device 9, 10, 32 attached to the arm system of the lifting device 1 (see, for example, FIGS. 5a, 5b and 6c). The selectable functions 27r and 27s shown in FIG. 10a lead, for example, to a menu via which information on an additional device in the form of an arm extension 10 or a working device 9 (see FIGS. 5a and 5b) or a work cage (see FIG. 6c) can be selected from a database stored in the memory 11 of the controller 6. The selectable function 27t shown in FIG. 11a, for example, leads to a setting mask via which information on additional devices 9, 10, 32 not stored in the memory 11 of the controller 6 can be entered. Using the selectable functions 27u, 27v, 27w, 27x shown in FIG. 11b, an angular position (angle 9) of an additional device attached to the arm system in the form of an arm extension 10 (see FIG. 5b) can be selected or entered. The selectable functions 27y, 27z shown in FIG. 11c serve to select the setup status of an additional device attached to the arm system in the form of, for example, one or more manually operable extraction extensions.

Figure 10D:
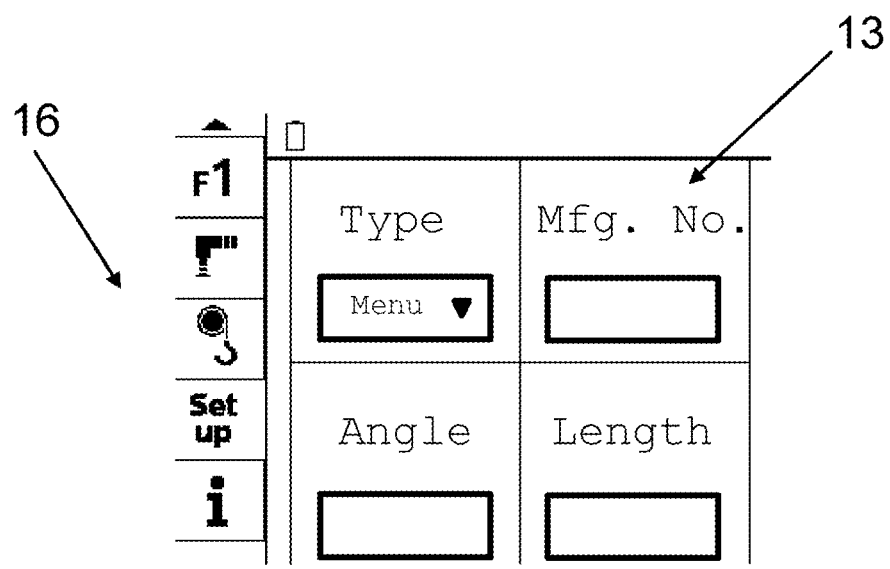

FIG. 10d shows an embodiment of an input mask 13 displayed on a display 16, via which information on the range of functions and/or dimensional information and/or angular positions for the at least one additional device 9, 10, 32 can be selected or entered and transferred to the controller 6.

It is not ruled out that further sensors for detecting an angular position and/or a dimension of at least one additional device 9, 10, 32 are arranged on the lifting device 1, which variables can be fed to the controller 6 via signal inputs and can be included in calculations of the controller 6. The controller 6 may have a suitable selectable function for detection.

Figure 11A:
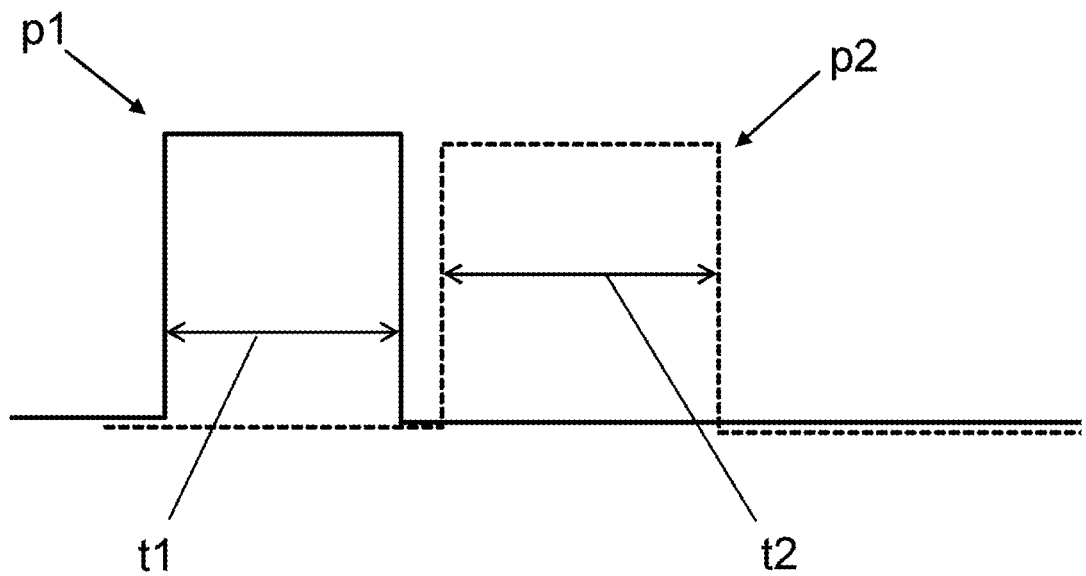
FIGS. 11a to 11c show schematic representations of control commands in the form of control pulses.
Figure 11B:
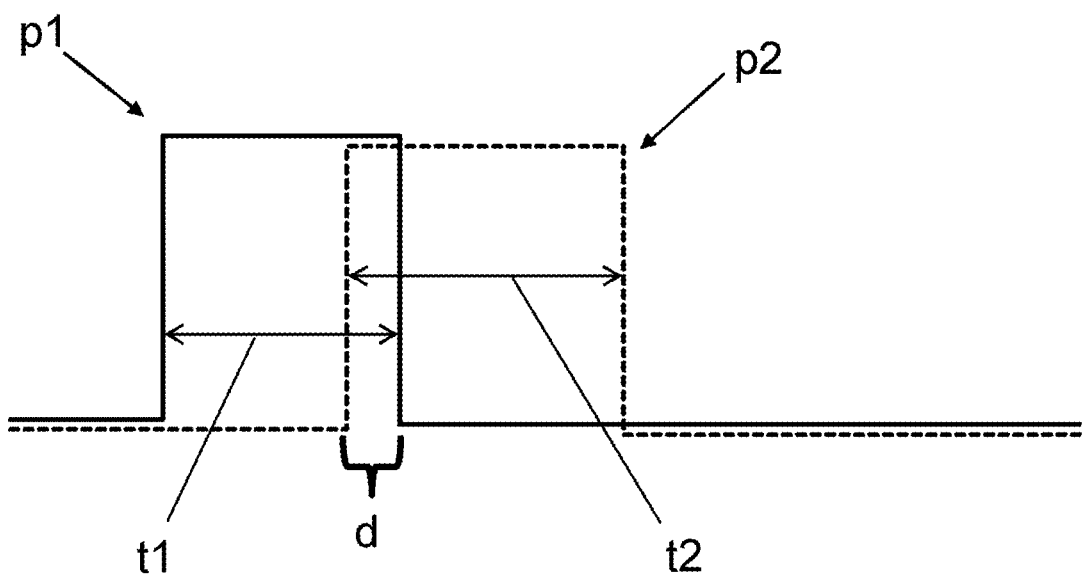

Actuators in the control phase, with reference to FIGS. 7a and 7b, for example the actuator 21 of the articulated arm 22 and an actuator of the sliding arm 8, can be controlled, for example, with control commands in the form of control pulses p1, p2 with an amplitude and a signal duration according to FIGS. 11a and 11b.

The output of the control pulses p1, p2 by the controller 6 can be sequential as illustrated in FIG. 11 a. As shown, the control pulses p1, p2 have different signal durations t1, t2. The signal durations t1, t2 can each correspond to a nominal signal duration.

Control pulses p1, p2 which follow one another in the sequence of control commands can also be output simultaneously by the controller 6 in portions, i.e. for the duration of an overlap d, as illustrated in FIG. 11b.

Thus, for example, according to FIG. 11b, one can first start with the activation of an actuator, for example the actuator 21 of the articulated arm 22, for the pulse duration t1 of the control pulse p1. Before the instantaneous control pulse p1 has ended, the activation of the further actuator, for example the actuator of the sliding arm 8, can already begin with the output of the control pulse p2 which follows sequentially according to a calculated sequence.

Figure 11C:
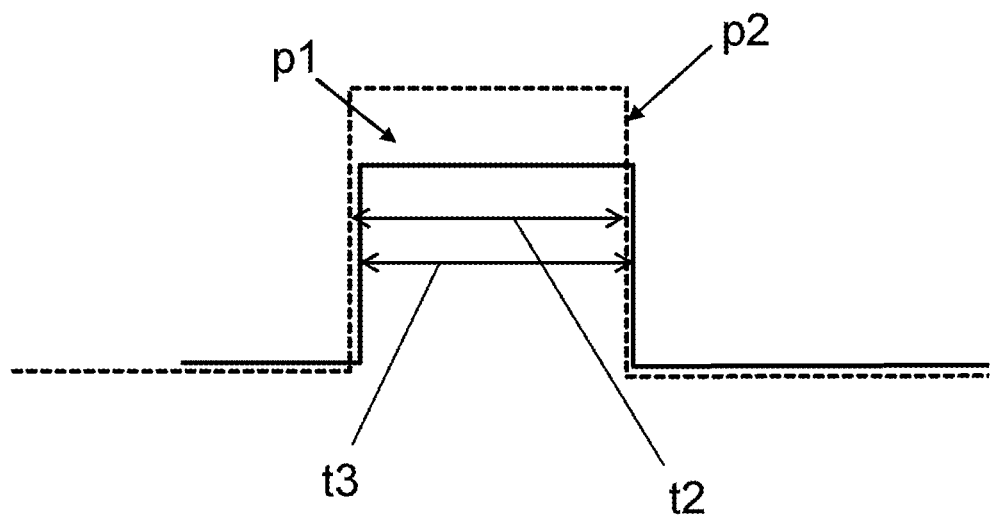

Actuators can be controlled at least partially simultaneously as in FIG. 11c, wherein a respective signal duration t1, t2 of the at least two control pulses p1, p2 is adjusted to the largest nominal signal duration of the control pulses, in the exemplary illustration the signal duration t2 of control pulse p2. The signal durations t1, t2 of different control pulses p1, p2 for different actuators can be scaled to the signal duration t2 of the control pulse p2 with the largest nominal signal duration t2 when the control pulse p2 is generated. The signal duration t3 of the control pulse p1 can be increased according to the nominal signal duration t2 of the control pulse p2, whereby the amplitude and thus a rate of change of the movement of the corresponding actuator can be scaled according to the changed signal duration t3. In this way, it can be achieved that when several of the involved actuators are controlled at least partially simultaneously, the end position preset for the target position is reached essentially simultaneously by all actuators involved.

| Reference numerals | |
|---|---|
| 1 | lifting device |
| 2 | crane column |
| 3 | main arm |
| 4 | articulated arm |
| 5 | sliding arm |
| 6 | controller |
| 7 | second articulated arm |
| 8 | second sliding arm |
| 9 | work tool |
| 10 | arm extension |
| 11 | memory |
| 12 | computing unit |
| 13 | setting mask |
| 14 | crane tip |
| 15 | control panel |
| 16 | display |
| 17 | operating element |
| 18 | main arm - sliding arm |
| 19 | vehicle |
| 20 | rotating gear |
| 21 | master cylinder |
| 22, 23, 25 | articulation cylinder |
| 24 | additional articulated arm |

-continued

| Reference numerals | |
|---|---|
| 26 | load |
| 27r-27z | functions |
| 28 | connection region |
| 29 | rotary knob |
| 30 | linear lever |
| 31 | button |
| 32 | work cage |
| v1, h1, h2, h3 | axes |
| α, β, φ, γ, L, J, H | degrees of freedom of arm system |
| Δα, Δβ, Δφ, Δγ, ΔL, ΔJ, ΔH | deviation along degree of freedom |
| φ0, φ1, φ2, φ3, φ4 | pivot angle of crane column |
| α0, α1, α2, α3, α4 | pivot angle of main arm |
| β1, β2, β3, β4 | pivot angle of articulated arm |
| γ1, γ2, γ3, γ4 | pivot angle of second articulated arm |
| λ1 | inclination angle of lifting device |
| L1, L2, L3, L4 | sliding positions of sliding arm |
| J1, J2, J3, J4 | sliding positions of second sliding arm |
| H1, H2, H3, H4 | sliding positions of main arm -sliding arm |
| ϑ | angle of arm extension |
| λ | inclination angle |
| a1, b1, g1, d1, w1, n1 | angle |
| x1, x2 | sliding position |
| s1, s2 | sliding position sensor |
| k1, k2, k3, k4 | articulation angle sensor |
| f1 | rotation angle sensor |
| N1 | inclination angle sensor |
| p1, p2 | control pulse |
| t1, t2, t3 | signal duration |

The invention claimed is:

1. A method for moving a lifting device, preferably a loading crane, wherein the lifting device has a controller and an arm system with arms with a geometry that can be changed by at least one actuator along at least one degree of freedom, the method comprising:
in a presetting phase, presetting at least one target position for the lifting device, wherein the presetting occurs by specifying the geometry of the arm system in at least one target position on the basis of the at least one degree of freedom via a user interface of the controller and/or the lifting device is brought into at least one target position by controlling actuators and in the at least one target position, the instantaneous geometry of the arm system is detected on the basis of the at least one degree of freedom,
in a measuring phase, detecting the instantaneous geometry of the arm system based on the at least one degree of freedom,
in a selection phase, selecting at least one target position specified in the presetting phase,
in a comparison phase, determining a geometrical deviation between the geometry of the at least one target position selected in the selection phase and the instantaneous geometry detected in the measuring phase by comparing the respective geometries of the arm system on the basis of the at least one degree of freedom,
in a generation phase, generating on the basis of the geometry deviation, determined in the comparison phase, at least one control command, preferably in the form of at least one control pulse, for controlling at least one of the actuators of the lifting device for approaching or at least partially transferring the arm system of the lifting device from the geometry detected in the measuring phase to the geometry of the at least one target position selected in the selection phase, and
in a control phase, at least partially moving the lifting device into the selected target position by controlling the actuators of the arm system with the at least one control command generated in the generation phase.

2. The method according to claim 1, wherein the at least one target position corresponds to a substantially freely selectable position of the lifting device.

3. The method according to claim 1, wherein the instantaneous geometry of the lifting device detected in the measuring phase corresponds to a geometry of the arm system which deviates from the target position selected in the selection phase—and which is preferably essentially freely selectable by controlling actuators.

4. The method according to claim 1, wherein the detection of an instantaneous geometry is carried out on the basis of sensor data from sensors arranged on the lifting device for angle measurement and/or length measurement.

5. The method according to claim 1, wherein:
when detecting the instantaneous geometry of the arm system, and/or
specifying the geometry of the arm system via a user interface of the controller,
a deflection of the arm system is determined on the basis of a calculation model.

6. The method according to claim 1, wherein:
when detecting the instantaneous geometry of the arm system, and/or
specifying the geometry of the arm system via a user interface of the controller,
a detection of an inclination of the lifting device relative to a preset or predeterminable spatial direction takes place.

7. The method according to claim 1, wherein:
when detecting the instantaneous geometry of the arm system, and/or
specifying the geometry of the arm system via a user interface of the controller,
a detection of a position of at least one additional device relative to the arm system of the lifting device and/or a geometry detection of the at least one additional device is carried out on the basis of at least one degree of freedom of the geometry of the at least one additional device.

8. The method according to claim 1, wherein the at least one control command is generated to approach or transfer the arm system of the lifting device from the geometry detected in the measuring phase to a geometry that approximates the geometry of the at least one target position selected in the selection phase within a predeterminable or preset tolerance range.

9. The method according to claim 1, wherein in the generation phase control commands are generated only for actuators, for which in the comparison phase a geometric deviation along the at least one degree of freedom corresponding to the actuator is determined.

10. The method according to claim 1, wherein in the presetting phase at least one value of at least one degree of freedom of arms of the arm system that are movable relative to one another along the at least one degree of freedom is specified and/or detected, in the measuring phase a repeated detection of at least one value of at least one degree of freedom takes place and in the comparison phase the geometry deviation is determined by determining a deviation of the at least one value selected accordingly in the selection phase and specified and/or detected in the presetting phase from the at least one value detected in the measuring phase.

11. The method according to claim 1, wherein the at least one control command generated in the generation phase comprises information regarding an actuator to be controlled and a nominal signal duration regarding the duration of the control.

12. The method according to claim 1, wherein at least two control commands are generated in the generation phase and the actuators are controlled in the control phase with the at least two control commands generated in the generation phase at least partially sequentially and/or at least partially simultaneously.

13. The method according to claim 1, wherein at least two control commands are generated in the generation phase and the actuators are controlled in the control phase with the at least two control commands generated in the generation phase,
- at least partially sequentially ordered according to the magnitude of the geometry change when controlling an actuator of the controlled actuators, and/or
- at least partially sequentially ordered according to the magnitude of the reduction of the load on the arm system when controlling an actuator of the controlled actuators, and/or
- at least partially ordered according to a cost function, and/or
- at least partially simultaneously, wherein a respective signal duration of the at least two control commands is adjusted to a largest nominal signal duration of the control commands.

14. The method according to claim 1, wherein in the presetting phase the lifting device is essentially freely movable with control commands generated by a user via a controller with operating commands for controlling actuators and in the control phase a movement of the lifting device takes place by at least one control command generated by a controller in the generation phase.

15. The method according to claim 1, wherein in the control phase, a movement of the lifting device is carried out at least partially automatically by outputting the at least one control command generated in the generation phase by a controller.

16. A controller for a hydraulic lifting device, preferably for a loading crane, which is designed to carry out the method for moving a lifting device according to claim 1, wherein the controller is configured to:
- in a first operating mode, perform a presetting phase for presetting at least one target position by specifying the geometry of the arm system in at least one target position on the basis of at least one degree of freedom via a user interface of the controller and/or by controlling actuators and for detecting the instantaneous geometry of the arm system on the basis of at least one degree of freedom,
- in a second operating mode, perform a measuring phase for repeatedly detecting the instantaneous geometry of the arm system on the basis of at least one degree of freedom,
- in a third operating mode, performing a selection phase to select at least one target position preset in the presetting phase,
- in a fourth operating mode, performing a comparison phase for determining the geometry deviation on the basis of at least one degree of freedom between the geometry of the at least one target position selected in the selection phase and the instantaneous geometry detected in the measuring phase,
- in a fifth operating mode, performing a generation phase for generating at least one control command for controlling at least one of the actuators of the lifting device for transferring the arm system of the lifting device from the geometry detected in the measuring phase to the geometry of the at least one target position selected in the selection phase can be carried out with a computing unit of the controller which is configured to this end, and
- in a sixth operating mode, performing a control phase for-preferably at least partially automated-controlling the actuators of the arm system of the lifting device can be carried out by outputting the at least one control command generated in the generation phase by the controller.

17. The controller for a lifting device according to claim 16, wherein the controller activates at least one operating element of a user interface in the sixth operating mode for controlling the actuators and by actuating the at least one operating element, the geometry of the arm system can be changed at least partially automatically by the controller, wherein preferably the controller controls a rate of change of the geometry of the arm system depending on an actuation of the at least one operating element of the user interface.

18. A lifting device, in particular a loading crane, with an arm system having a plurality of arms movable by actuators, wherein the arm system has at least:
- a crane column rotatable about a rotation axis by a first actuator, wherein the arm system has a first degree of freedom due to the pivotable mounting of the crane column,
- a main arm that can be pivoted relative to the crane column by means of a second actuator, wherein the arm system has a second degree of freedom due to the pivotable mounting of the main arm,
- and wherein the lifting device has a controller according to claim 16, with which control commands can be output to actuators of the arm system in order to change the geometry of the arm system, wherein an instantaneous geometry of the arm system can be detected by the controller on the basis of sensors installed on the arm system on the basis of the degrees of freedom of the lifting device.

19. A computer program product comprising commands which, when executed by the computing unit of the controller according to claim 16, cause the controller to carry out a method from a memory which is in a data connection with the computing unit or can be brought into such a connection with the computing unit.

20. A non-transitory data carrier signal that transmits the computer program product according to claim 19.

\* \* \* \* \*